United States Patent
Hirakawa

(10) Patent No.: US 11,665,311 B2
(45) Date of Patent: May 30, 2023

(54) VIDEO PROCESSING SYSTEM

(71) Applicant: NEC Corporation, Tokyo (JP)

(72) Inventor: Yasufumi Hirakawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/909,252

(22) Filed: Jun. 23, 2020

(65) Prior Publication Data

US 2021/0014451 A1    Jan. 14, 2021

Related U.S. Application Data

(63) Continuation of application No. 16/444,111, filed on Jun. 18, 2019, which is a continuation of application
(Continued)

(30) Foreign Application Priority Data

Feb. 14, 2014    (JP) .............................. JP2014-026467

(51) Int. Cl.
*G08B 1/08*    (2006.01)
*H04N 5/92*    (2006.01)
(Continued)

(52) U.S. Cl.
CPC ......... *H04N 5/9201* (2013.01); *G06F 16/784* (2019.01); *G06F 16/786* (2019.01);
(Continued)

(58) Field of Classification Search
CPC ...... H04N 5/9201; H04N 7/18; H04N 9/8205; H04N 7/183; H04N 5/232933;
(Continued)

(56) References Cited

U.S. PATENT DOCUMENTS 4,277,038 A  *  7/1981  Yates ..................... F41G 7/008
                                                244/3.15
7,088,846 B2     8/2006  Han et al.
(Continued)

FOREIGN PATENT DOCUMENTS

JP    2007-280043 A    10/2007
JP    2008-092279 A     4/2008
(Continued)

OTHER PUBLICATIONS

Akihiro Sekura and Masashi Toda, "The Video Retrieval System Using Hand-Drawing Sketch Depicted by Moving Object and Background," Information Processing Society of Japan, Interaction 2011.
(Continued)

*Primary Examiner* — Gims S Philippe
(74) *Attorney, Agent, or Firm* — Sughrue Mion, PLLC

(57) ABSTRACT

A video processing system includes: an object movement information acquiring means for detecting a moving object moving in a plurality of segment regions from video data obtained by shooting a monitoring target area, and acquiring movement segment region information as object movement information, the movement segment region information representing segment regions where the detected moving object has moved; an object movement information and video data storing means for storing the object movement information in association with the video data corresponding to the object movement information; a retrieval condition inputting means for inputting a sequence of the segment regions as a retrieval condition; and a video data retrieving means for retrieving the object movement information in accordance with the retrieval condition and outputting video data stored in association with the retrieved object movement information, the object movement information being
(Continued)

stored by the object movement information and video data storing means.

12 Claims, 26 Drawing Sheets

Related U.S. Application Data

No. 15/117,812, filed as application No. PCT/JP2015/000531 on Feb. 5, 2015, now Pat. No. 10,389,969.

(51) Int. Cl.
| | |
|---|---|
| *G06F 16/783* | (2019.01) |
| *H04N 7/18* | (2006.01) |
| *H04N 9/82* | (2006.01) |
| *G06V 20/40* | (2022.01) |
| *G06V 20/52* | (2022.01) |
| *H04N 23/61* | (2023.01) |
| *H04N 23/63* | (2023.01) |
| *H04N 23/661* | (2023.01) |
| *H04N 5/77* | (2006.01) |

(52) U.S. Cl.
CPC .............. *G06V 20/49* (2022.01); *G06V 20/52* (2022.01); *G06V 20/53* (2022.01); *H04N 5/77* (2013.01); *H04N 7/18* (2013.01); *H04N 7/183* (2013.01); *H04N 9/8205* (2013.01); *H04N 23/61* (2023.01); *H04N 23/631* (2023.01); *H04N 23/661* (2023.01)

(58) Field of Classification Search
CPC .. H04N 5/23206; H04N 5/23293; H04N 5/77; H04N 5/23218; G06F 16/784; G06F 16/786; G06K 9/00771; G06K 9/00765; G06K 9/00778
USPC ......................................................... 348/143
See application file for complete search history.

(56) References Cited

U.S. PATENT DOCUMENTS

| | | | | |
|---|---|---|---|---|
| 7,136,507 | B2 * | 11/2006 | Han ................... | G06K 9/00335 382/103 |
| 7,194,109 | B2 | 3/2007 | Nakamura et al. | |
| 7,627,199 | B2 | 12/2009 | Sato et al. | |
| 7,801,330 | B2 | 9/2010 | Zhang et al. | |
| 8,284,258 | B1 * | 10/2012 | Cetin ................. | G06K 9/00771 348/169 |
| 8,457,466 | B1 | 6/2013 | Sharma et al. | |
| 9,208,675 | B2 * | 12/2015 | Xu ...................... | G06K 9/00771 |
| 2005/0105765 | A1 | 5/2005 | Han et al. | |
| 2006/0066719 | A1 | 3/2006 | Haering et al. | |
| 2006/0291841 | A1 * | 12/2006 | Fukumoto .......... | H04N 5/23264 396/55 |
| 2007/0005795 | A1 | 1/2007 | Gonzalez | |
| 2007/0182818 | A1 | 8/2007 | Buehler | |
| 2007/0248244 | A1 | 10/2007 | Sato et al. | |
| 2008/0304706 | A1 * | 12/2008 | Akisada ................ | H04N 7/188 382/103 |
| 2010/0045799 | A1 | 2/2010 | Lei et al. | |
| 2010/0098297 | A1 | 4/2010 | Zhang | |
| 2010/0169330 | A1 * | 7/2010 | Albers ................ | G06F 16/7335 707/754 |
| 2011/0205359 | A1 * | 8/2011 | Lee .......................... | G06T 7/285 348/143 |
| 2011/0261213 | A1 | 10/2011 | Rottler et al. | |
| 2012/0114176 | A1 * | 5/2012 | Kawano ............. | G06K 9/00771 382/103 |
| 2012/0219174 | A1 | 8/2012 | Wu | |
| 2013/0051624 | A1 * | 2/2013 | Iwasaki .............. | G06K 9/00791 382/103 |
| 2013/0098309 | A1 | 4/2013 | Nohara et al. | |
| 2013/0234926 | A1 * | 9/2013 | Rauber ............... | G06F 3/04817 345/156 |
| 2015/0193001 | A1 * | 7/2015 | Kurokawa ............. | G06F 3/017 345/156 |
| 2017/0011529 | A1 | 1/2017 | Urashita | |

FOREIGN PATENT DOCUMENTS

| | | |
|---|---|---|
| JP | 2008-211847 A | 9/2008 |
| JP | 2010-123069 A | 6/2010 |

OTHER PUBLICATIONS

International Search Report for PCT Application No. PCT/JP2015/000531, dated Apr. 21, 2015.
U.S. Office Action for U.S. Appl. No. 16/444,138 dated Jan. 10, 2020.
Japanese Office Action for JP Application No. 2015-562730 dated Jul. 18, 2017 with English Translation.
U.S. Office Action and PTO-892 for U.S. Appl. No. 16/444,111 dated Oct. 29, 2020.
Wang Zhiming et al., Cooperative Neural Network Background Model for Multi-Modal Video Surveillance, Dec. 3, 2011, IEEE; pp. 249-254.

* cited by examiner

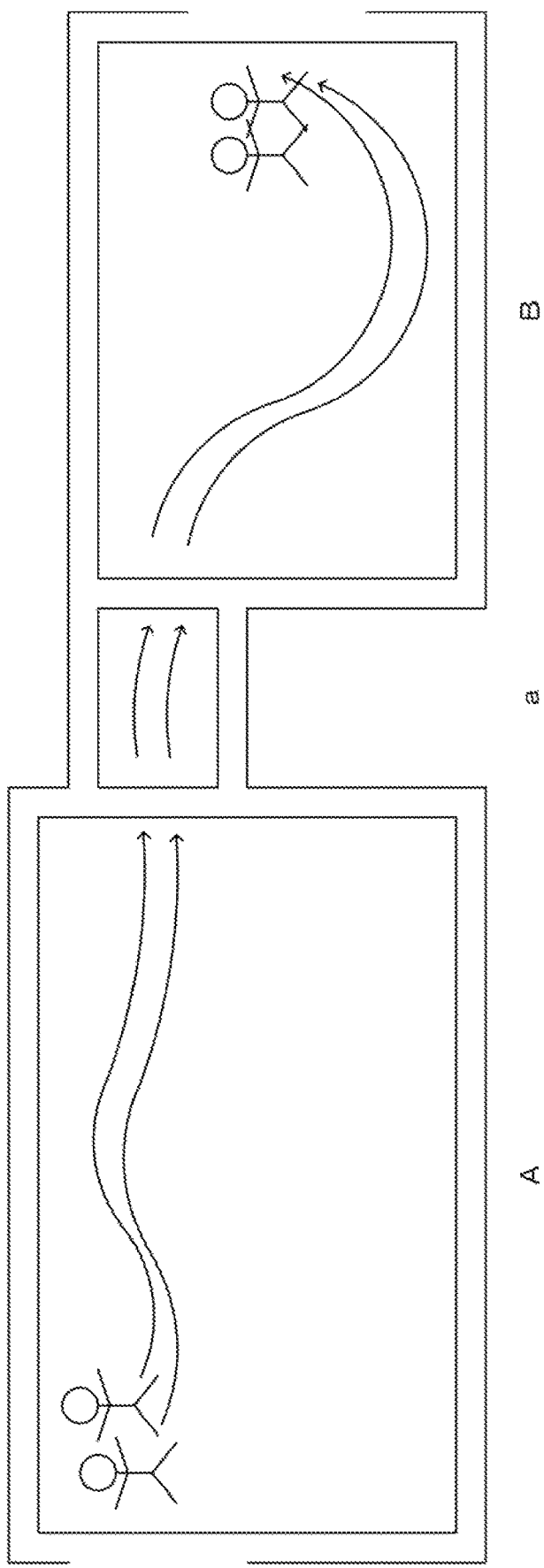

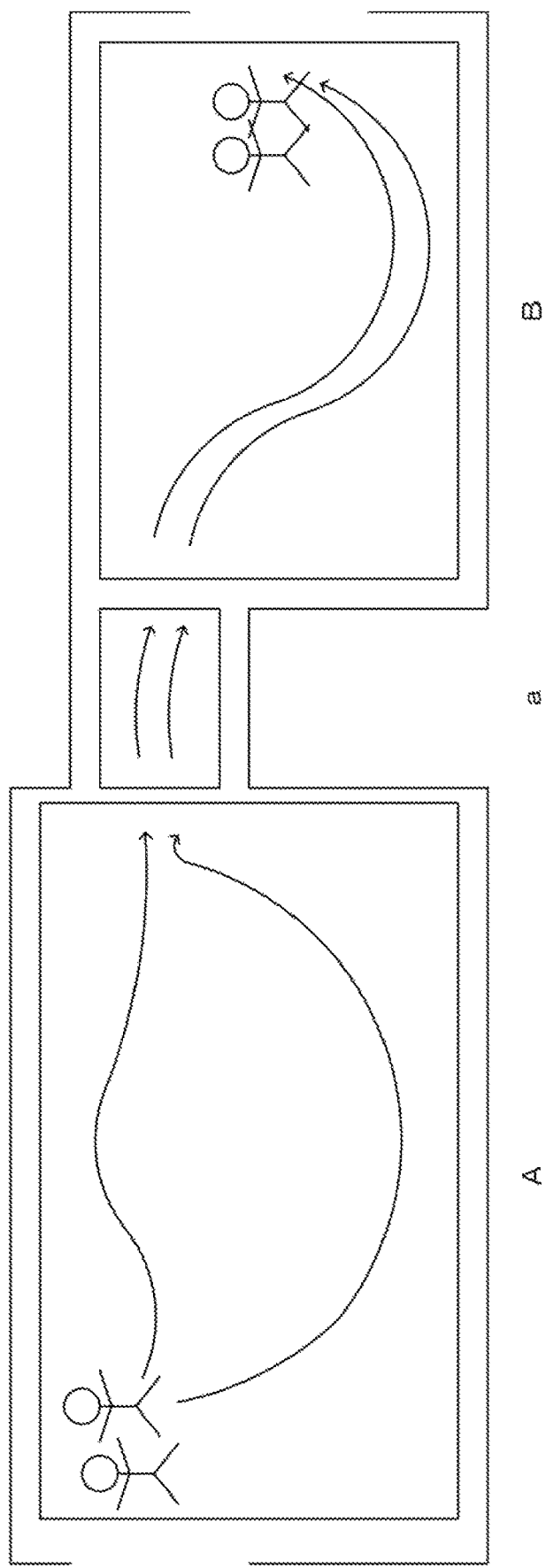

Fig.15
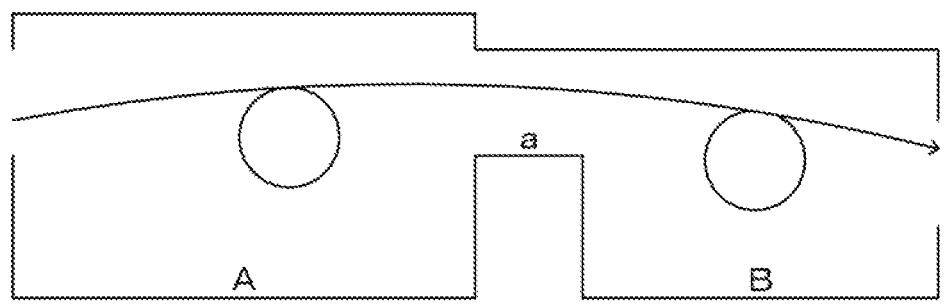
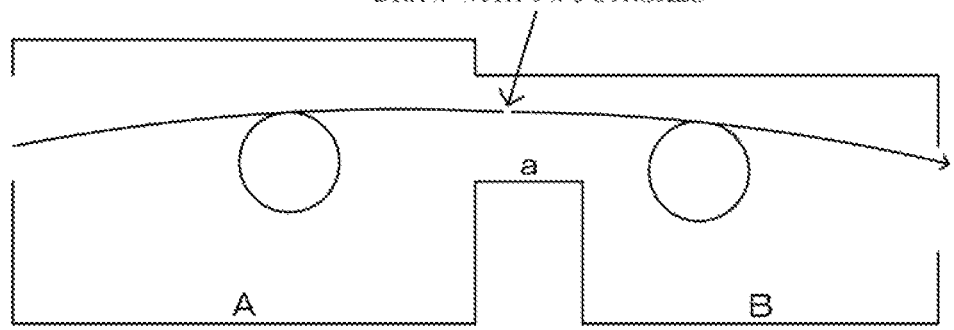

Fig.20
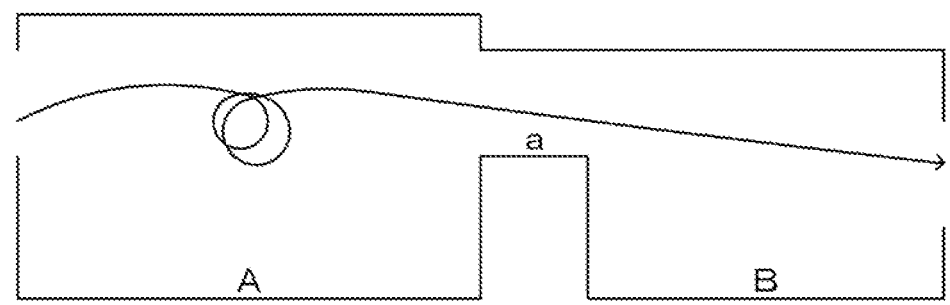
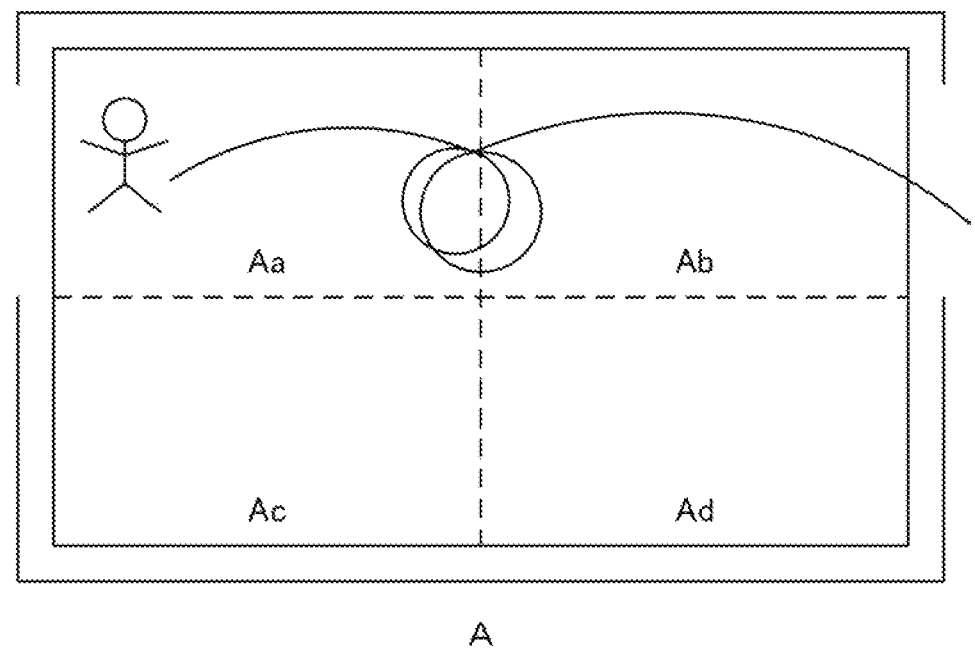

VIDEO PROCESSING SYSTEM

REFERENCE TO RELATED APPLICATION

This present application is a Continuation Application of Ser. No. 16/444,111 filed on Jun. 18, 2019, which is a Continuation Application of Ser. No. 15/117,812 filed on Aug. 10, 2016, (U.S. Pat. No. 10,389,969 issued on Aug. 20, 2019), which is a National Stage Entry of International Application PCT/JP2015/000531 filed on Feb. 5, 2015, which claims the benefit of priority from Japanese Patent Application 2014-026467, filed on Feb. 14, 2014, the disclosures of all of which are incorporated in their entirety by reference herein.

TECHNICAL FIELD

The present invention relates to a video processing system, a video processing device, a video processing method, and a program.

BACKGROUND ART

A monitoring system which uses a monitoring camera and monitors a given monitoring target area is known. Such a monitoring system is configured to make it possible to store video images captured by the monitoring camera into a storage device and retrieve and reproduce a desired video image when necessary. However, it is extremely inefficient to reproduce all of the video images and manually find a desired video image.

Therefore, there is a known technique which enables retrieval of a video image in which an object performing specific behavior is recorded by detecting and storing metadata of objects moving in the captured video images. Use of such a technique enables retrieval of a video image in which an object performing specific behavior is recorded from among a large number of video images captured by the monitoring camera.

As such a technique for retrieving a video image in which an object performing specific behavior is recorded from among a large number of video images, for example, Non-Patent Document 1 is known. Non-Patent Document 1 discloses a technique of extracting the shape feature and motion feature of an object and the shape feature of a background and compiling them into a database in advance, and creating a query with a hand-drawing sketch of three elements composed of the shape of a moving object, the motion of the moving object and a background and performing retrieval of a video image. In Non-Patent Document 1, a database is prepared by calculating the average vector of optical flows (OFs) in regions of a moving object in each of frame images and regarding continuous data obtained by gathering the vectors in the respective frame images as the motion feature of the moving object. Likewise, continuous data of vectors is extracted from a hand-drawing sketch drawn by the user and regarded as the motion feature of a query.

Non-Patent Document 1: Akihiro Sekura and Masashi Toda, "The Video Retrieval System Using Hand-Drawing Sketch Depicted by Moving Object and Background," Information Processing Society of Japan, Interaction 2011

There is a case where a monitoring system using a monitoring camera needs to separate a monitoring target area into a plurality of regions determined in advance and, without considering a movement path in the regions, retrieve a video image of a person or the like moving from one specific region to another specific region. For performing such retrieval by using the technique disclosed in Non-Patent Document 1, there is a need to input a number of queries in which movement paths in the regions are different. This is because according to the technique disclosed in Non-Patent Document 1, a video image of a person or the like moving in the same regions but moving through a movement path in the regions different from a movement path of a query may be excluded from a retrieval subject.

However, in a case where there are a variety of movement paths in the regions, the number of movement paths for moving in the regions is huge, and it is actually difficult to input a number of queries including different movement paths in the regions. Therefore, complete retrieval is difficult.

SUMMARY

Accordingly, an object of the present invention is to provide a video processing system which solves the above-mentioned problem, namely, a problem that it is difficult to completely retrieve video images of a person or the like moving from a specific region to another specific region without considering movement paths in the regions.

In order to achieve the object, a video processing system as an aspect of the present invention includes:

an object movement information acquiring means for detecting a moving object from video data and acquiring movement segment region information and segment region sequence information as object movement information, the video data being obtained by separating a monitoring target area into a predetermined plurality of segment regions and shooting the monitoring target area, the moving object moving in the plurality of segment regions, the movement segment region information representing segment regions where the detected moving object has moved, the segment region sequence information representing a sequence of the segment regions corresponding to movement of the moving object;

an object movement information and video data storing means for storing the object movement information in association with the video data corresponding to the object movement information, the object movement information being acquired by the object movement information acquiring means;

a retrieval condition inputting means for inputting the segment regions and a sequence of the segment regions as a retrieval condition, the segment regions showing movement of a retrieval target object to be retrieved; and a video data retrieving means for retrieving the object movement information in accordance with the retrieval condition and outputting video data stored in association with the retrieved object movement information, the object movement information being stored by the object movement information and video data storing means, the retrieval condition being inputted by the retrieval condition inputting means.

Further, a video processing device as another aspect of the present invention includes:

an object movement information acquisition part configured to detect a moving object from video data and acquire movement segment region information and segment region sequence information as object movement information, the video data being obtained by separating a monitoring target area into a predetermined plurality of segment regions and shooting the monitoring target area, the moving object moving in the plurality of segment regions, the movement segment region information representing segment regions where the detected moving object has moved, the segment region sequence information representing a sequence of the segment regions corresponding to movement of the moving object;

an object movement information and video data storage part configured to store the object movement information in association with the video data corresponding to the object movement information, the object movement information being acquired by the object movement information acquisition part;

a retrieval condition input part configured to input the segment regions and a sequence of the segment regions as a retrieval condition, the segment regions showing movement of a retrieval target object to be retrieved; and a video data retrieval part configured to retrieve the object movement information in accordance with the retrieval condition and output video data stored in association with the retrieved object movement information, the object movement information being stored by the object movement information and video data storage part, the retrieval condition being inputted by the retrieval condition input part.

Further, a video processing method as another aspect of the present invention includes:

detecting a moving object from video data, acquiring movement segment region information and segment region sequence information as object movement information, and storing the object movement information in association with the video data corresponding to the object movement information, the video data being obtained by separating a monitoring target area into a predetermined plurality of segment regions and shooting the monitoring target area, the moving object moving in the plurality of segment regions, the movement segment region information representing segment regions where the detected moving object has moved, the segment region sequence information representing a sequence of the segment regions corresponding to movement of the moving object; and inputting the segment regions and a sequence of the segment regions as a retrieval condition, retrieving the object movement information in accordance with the inputted retrieval condition, and outputting video data stored in association with the retrieved object movement information, the retrieval condition being inputted by the retrieval condition input part, the segment regions showing movement of a retrieval target object to be retrieved.

Further, a computer program as another aspect of the present invention includes instructions for causing a video processing device to function as:

an object movement information acquisition part configured to detect a moving object from video data and acquire movement segment region information and segment region sequence information as object movement information, the video data being obtained by separating a monitoring target area into a predetermined plurality of segment regions and shooting the monitoring target area, the moving object moving in the plurality of segment regions, the movement segment region information representing segment regions where the detected moving object has moved, the segment region sequence information representing a sequence of the segment regions corresponding to movement of the moving object;

an object movement information and video data storage part configured to store the object movement information in association with the video data corresponding to the object movement information, the object movement information being acquired by the object movement information acquisition part;

a retrieval condition input part configured to input the segment regions and a sequence of the segment regions as a retrieval condition, the segment regions showing movement of a retrieval target object to be retrieved; and a video data retrieval part configured to retrieve the object movement information in accordance with the retrieval condition and output video data stored in association with the retrieved object movement information, the object movement information being stored by the object movement information and video data storage part, the retrieval condition being inputted by the retrieval condition input part.

With the abovementioned configurations, the present invention enables complete retrieval of video images of a person or the like moving from a specific region to another specific region without considering movement paths in the regions.

BRIEF DESCRIPTION OF DRAWINGS

FIG. 11 is a view for describing the state of a trajectory determined by the trajectory information and segment region associating part;

FIG. 12 is a view for describing the state of a trajectory determined by the trajectory information and segment region associating part;

FIG. 15 is a view showing an example of trajectory state information inputted into the query input part;

FIG. 20 is a view for describing change of segment regions in accordance with an enlarging/shrinking operation;

EXEMPLARY EMBODIMENTS

Next, the exemplary embodiments of the present invention will be described in detail referring to the attached drawings.

First Exemplary Embodiment

Figure 1:
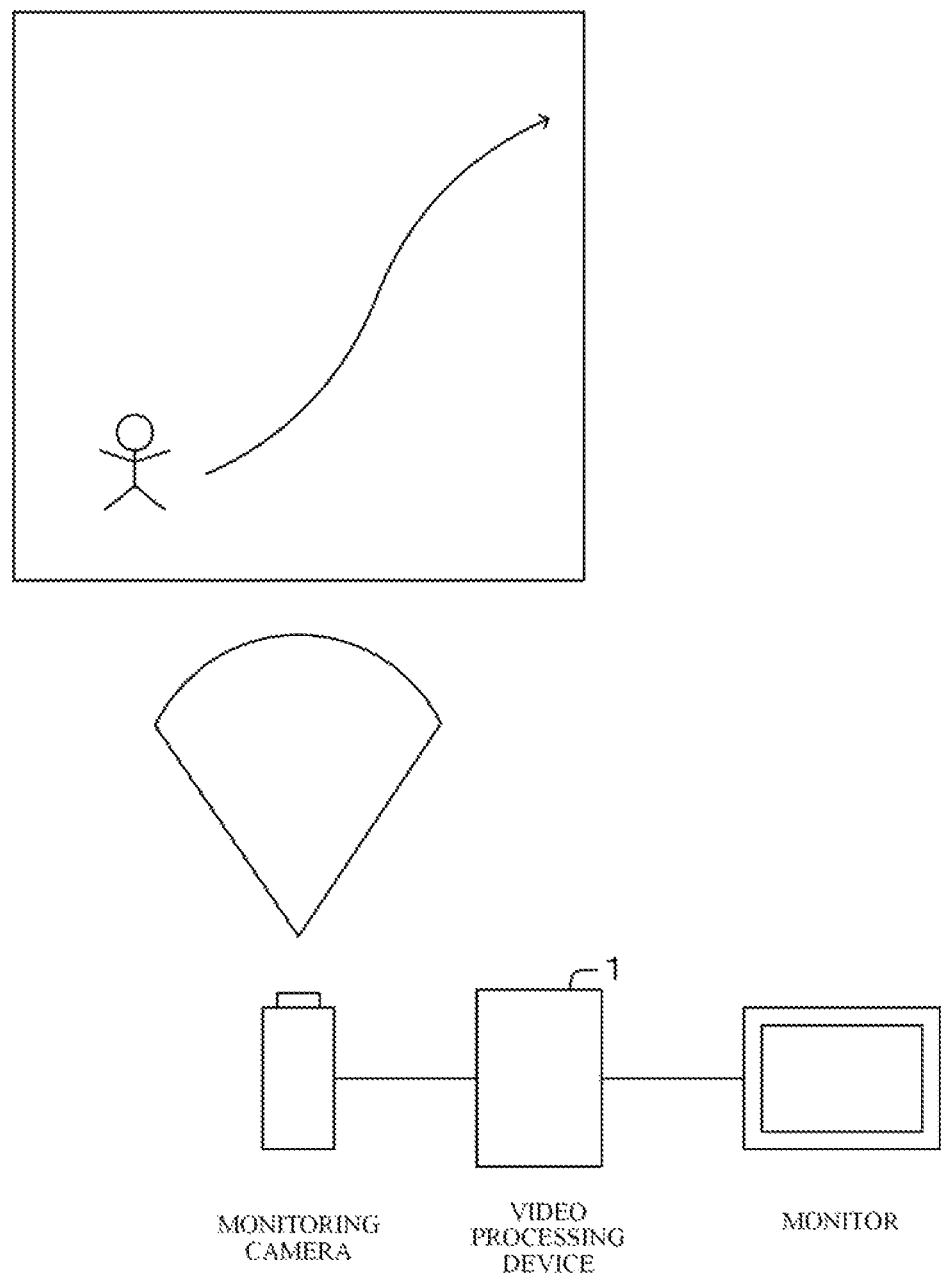
FIG. 1 is a view for describing the overview of a video processing device according to a first exemplary embodiment of the present invention.

Referring to FIG. 1, a video processing device 1 according to a first exemplary embodiment of the present invention is a device which stores video images captured by an external device such as a monitoring camera, retrieves a desired video image from among the stored video images, and outputs the video image to an output device such as a monitor.

Figure 2:
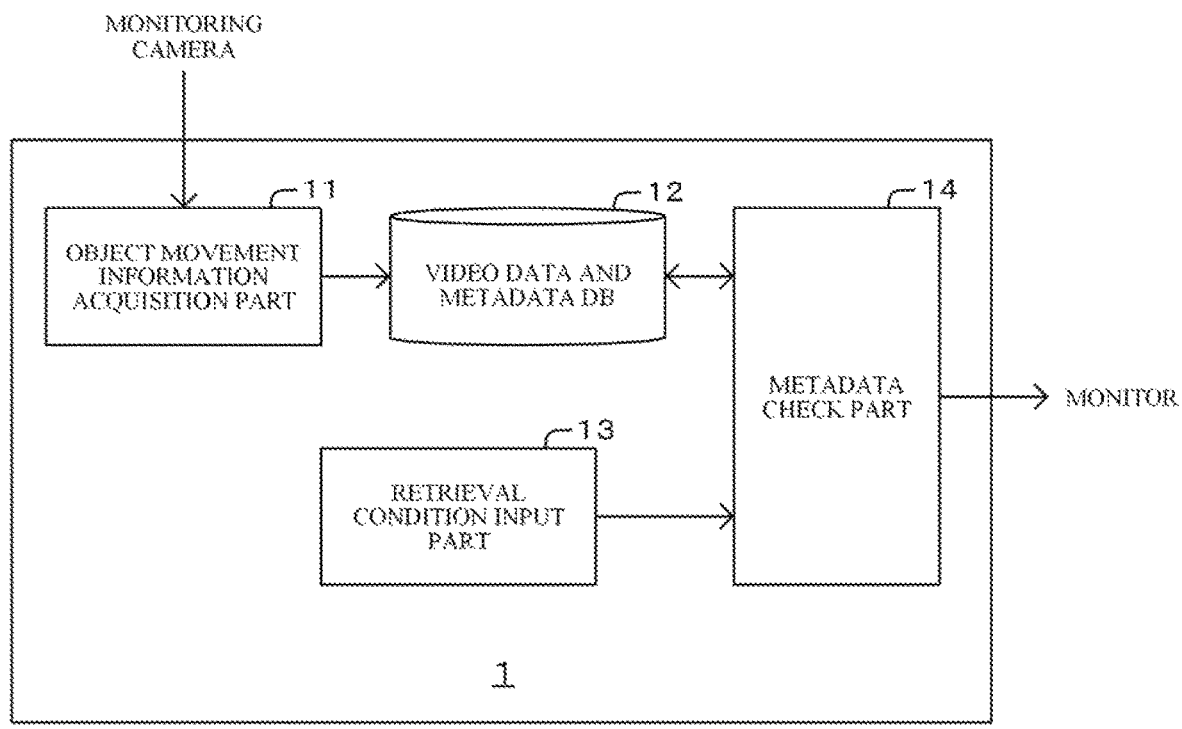
FIG. 2 is a block diagram of the video processing device according to the first exemplary embodiment of the present invention.

Referring to FIG. 2, the video processing device 1 according to the first exemplary embodiment of the present invention has an object movement information acquisition part 11 (an object movement information acquiring means), a video data and metadata DB (DataBase) 12 (an object movement information and video data storing means), a retrieval condition input part 13 (a retrieval condition inputting means), and a metadata check part 14 (a video data retrieving means). Herein, the video processing device 1 is an information processing device including an arithmetic device and a storage device. The video processing device 1 realizes the respective functions described above by execution of a program stored in the storage device by the arithmetic device.

The object movement information acquisition part 11 has a function of acquiring object movement information including movement segment region information and segment region sequence information from video data received from an external device such as a monitoring camera (a video data acquiring means). To be specific, the object movement information acquisition part 11 receives video data from an external device such as a monitoring camera. Subsequently, the object movement information acquisition part 11 separates a monitoring target area in an image of the received video data into a plurality of segment regions determined in advance, and detects a person (a moving object) moving in the segment regions.

Herein, segment regions are a plurality of regions obtained by separating a monitoring target area, and are regions indicating units in each of which behaviors of a person are gathered. The object movement information acquisition part 11 separates a monitoring target area based on, for example, the definition of segment regions stored in a segment region range storage part, which is not shown in the drawings.

The range of a segment region may be any range. For example, it is possible to define the range of a segment region on the basis of specific spaces such as a room and a corridor, or define the range of a segment region based on the behavior of a person (e.g., the frequency of passage of a person) or the like. The range of a segment region may be properly changed based on the frequency of passage of a person, the behavioral tendency of a person, or the like. As described later, the user can retrieve metadata (object movement information) for each segment region. Therefore, it becomes possible to define rooms and corridors as segment regions and thereby retrieve video data for each room and each corridor.

Further, detection of a moving person by the object movement information acquisition part 11 is possible by using a variety of known techniques. The object movement information acquisition part 11 can detect a moving person by obtaining a difference between an image frame of video data and a background image acquired in advance. Also, the object movement information acquisition part 11 can check whether or not the same pattern as an image region called a template appears in an image frame and thereby detect a person having the same pattern as the template, for example. Alternatively, the object movement information acquisition part 11 may detect a moving object by using a motion vector. Moreover, the object movement information acquisition part 11 can track a moving object by using a Kalman filter or a particle filter. Thus, in detection of a moving person by the object movement information acquisition part 11, it is possible to use various methods by which it is possible to detect a person moving in a plurality of segment regions.

The object movement information acquisition part 11 thus detects a moving person. Then, the object movement information acquisition part 11 acquires movement segment region information indicating segment regions where the detected person moves and segment region sequence information indicating the sequence of the segment regions corresponding to the movement of the detected person, as object movement information (metadata).

Herein, movement segment region information is information indicating segment regions where the detected person moves. As described above, the object movement information acquisition part 11 separates a monitoring target area into a plurality of segment regions determined in advance. Therefore, the object movement information acquisition part 11 detects segment regions where the detected person moves, and acquires the detected segment regions as movement segment region information. Acquisition of movement segment region information by the object movement information acquisition part 11 can be realized by using a variety of methods, for example, describing the trajectory of movement of a person and associating the trajectory with segment regions, or sequentially acquiring segment regions where a person appearing in the respective image frames exists.

Segment region sequence information is information indicating the sequence of segment regions corresponding to movement of the detected person. In other words, segment region sequence information is information indicating the sequence of passage in segment regions where the detected person passes. Acquisition of segment region sequence information by the object movement information acquisition part 11 can also be realized by using a variety of methods, for example, associating the trajectory of movement of a person with segment regions, or determining the sequence of passage in segment regions by using shooting time of each image frame.

Thus, the object movement information acquisition part 11 acquires information indicating segment regions where a person moves, as movement segment region information. Moreover, the object movement information acquisition part 11 acquires, in addition to the movement segment region information, the passage sequence at a time when the person moves in the segment regions indicated by the movement segment region information, as segment region sequence information. Consequently, the object movement information acquisition part 11 can acquire object movement information composed of movement segment region information indicating segment regions through which a person moving in a plurality of segment regions passes and segment region sequence information indicating the passage sequence of the segment regions. After that the object movement information acquisition part 11 transmits the acquired object movement information to the video data and metadata DB 12.

The object movement information acquisition part 11 may be configured to, when acquiring object movement information, acquire time information indicating time when a detected person passes through a segment region (time when the person appears in the segment region and time when the person exits the segment region), and place information indicating the place of the segment region. In a case where the object movement information acquisition part 11 acquires time information and place information, the acquired time information and place information are transmitted to the video data and metadata DB 12 together with the object movement information (or included in the object movement information). Place information may be included in movement segment region information.

Further, the object movement information acquisition part 11 composes object movement information so as to be capable of retrieving video data corresponding to object movement information based on the object movement information (so as to be capable of associating object movement information with video data corresponding to the object movement information). For example, the object movement information acquisition part 11 provides object movement information with information for identifying video data from which the object movement information is acquired. Moreover, for example, the object movement information acquisition part 11 provides object movement information with movement start time and movement end time of a detected person. By providing object movement information with such information, it becomes possible to associate and store object movement information and video data corresponding to the object movement information as described later. Moreover, it becomes possible to output retrieved video data corresponding to object movement information to the output device. Herein, video data corresponding to object movement information is video data in which a person moving in segment regions indicated by object movement information is recorded, and is video data from which the object movement information acquisition part 11 has acquired the object movement information.

Further, the object movement information acquisition part 11 can be configured to transmit video data acquired from an external device such as a monitoring camera to the video data and metadata DB 12. Herein, the video processing device 1 may be configured to transmit video data acquired from an external device to the video data and metadata DB 12 not via the object movement information acquisition part 11.

The video data and metadata DB 12 is configured by, for example, a storage device such as a hard disk or a RAM (Random Access Memory), and stores various kinds of data. Herein, data stored by the video data and metadata DB 12 is object movement information and video data. In this exemplary embodiment, the video data and metadata DB 12 associates and stores object movement information and video data corresponding to the object movement information.

The video data and metadata DB 12 receives video data received from an external device such as a monitoring camera by, for example, receiving video data transmitted by the object movement information acquisition part 11. Then, the video data and metadata DB 12 stores the received video data. The video data and metadata DB 12 also acquires object movement information transmitted by the object movement information acquisition part 11. Then, the video data and metadata DB 12 associates and stores object movement information and video data corresponding to the object movement information. The video data and metadata DB 12 thus stores video data and object movement information associated with the video data.

Further, the video data and metadata DB 12 transmits the object movement information and video data stored therein to the metadata check part 14 or the output device in response to a request by the metadata check part 14. The details of retrieval of the object movement information stored in the video data and metadata DB 12 by the metadata check part 14 will be described later.

In a case where the object movement information acquisition part 11 is configured to transmit time information and place information, the video data and metadata DB 12 stores the time information and the place information together with object movement information.

The retrieval condition input part 13 has a function of inputting segment regions and the sequence of the segment regions as retrieval conditions. To be specific, the retrieval condition input part 13 includes an input device such as a touchscreen or a keyboard, and is configured so that it is possible to input retrieval conditions by operating the input device. Input of retrieval conditions into the retrieval condition input part 13 is conducted by selecting segment regions displayed on a screen with a mouse, for example. In this case, retrieval conditions are the selected segment regions and the sequence of selection of the segment regions. Alternatively, input of retrieval conditions into the retrieval condition input part 13 is conducted by drawing a line representing the trajectory of a retrieval target person on a screen where segment regions are shown as the background, for example. In this case, retrieval conditions are segment regions where the drawn line passes and the sequence of passage. After that, the retrieval condition input part 13 transmits the inputted retrieval conditions to the metadata check part 14. Then, retrieval of object movement information based on the retrieval conditions is performed by the metadata check part 14.

The metadata check part 14 has a function of searching object movement information (metadata) stored in the video data and metadata DB 12 based on retrieval conditions received from the retrieval condition input part 13.

To be specific, the metadata check part 14 receives retrieval conditions including segment regions and the sequence of the segment regions from the retrieval condition input part 13. Subsequently, the metadata check part 14 performs retrieval from among object movement information stored in the video data and metadata DB 12 by using the received retrieval conditions.

Herein, the metadata check part 14 can be configured to retrieve only object movement information identical to the retrieval conditions (identical segment regions, identical sequence) from the video data and metadata DB 12. Alternatively, the metadata check part 14 can be configured to retrieve object movement information identical and/or similar to the retrieval conditions from the video data and metadata DB 12.

Similarity of retrieval conditions and object movement information can be determined by calculating a distance between the arrangement of segment regions (segment regions and the sequence of the segment regions) represented by the retrieval conditions and the arrangement of segment regions represented by the object movement information, for example. Meanwhile, it is possible to configure the metadata check part 14 so as to determine whether or not retrieval conditions and object movement information are similar to each other by using a variety of general criterions for determining similarity other than the abovementioned method.

Further, the metadata check part 14 has a function of transmitting video data stored in association with the retrieved object movement information to the output device such as the monitor. In other words, the metadata check part 14 receives video data stored in association with the object movement information retrieved from the video data and metadata DB 12, and transmits the video data to the output device such as the monitor.

That is the configuration of the video processing device 1. By configuring the video processing device 1 as described above, it becomes possible to retrieve video images which show a person moving in desired segment regions in a desired sequence from among video images stored by the video processing device 1. In other words, it becomes possible to completely retrieve video images of a person or the like moving from a specific region to another specific region without considering a movement path in the regions (in the respective segment regions). Next, the operation of the video processing device 1 according to this exemplary embodiment will be described.

An operation on acquiring object movement information (metadata) from video data acquired from the external device such as the monitoring camera and storing the object movement information and the video data will be described.

Figure 3:
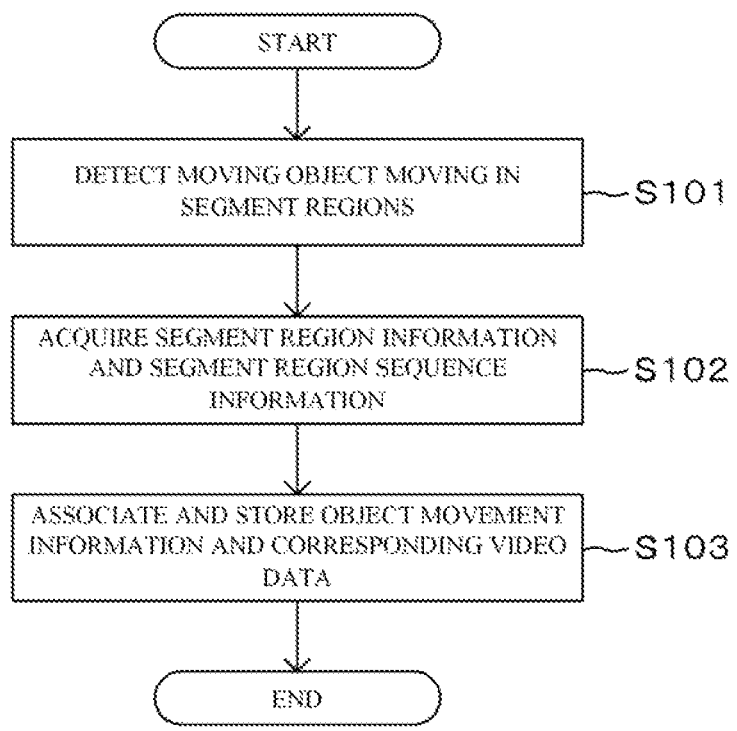
FIG. 3 is a flowchart showing an example of an operation performed when the video processing device according to the first exemplary embodiment of the present invention stores object movement information.

Upon acquisition of video data from the monitoring camera or the like, the object movement information acquisition part 11 of the video processing device 1 starts execution of a process shown in FIG. 3. The object movement information acquisition part 11 separates a monitoring target area in an image of the received video data into a plurality of segment regions determined in advance, and detects a person (a moving object) moving in the segment regions (step S101).

Subsequently, the object movement information acquisition part 11 acquires, as object movement information (i.e., metadata), movement segment region information indicating segment regions where the detected person moves and segment region sequence information indicating the sequence of the segment regions corresponding to the movement of the detected person (step S102).

Then, the object movement information acquisition part 11 transmits the acquired object movement information to the video data and metadata DB 12. Also, the object movement information acquisition part 11 transmits the video data to the video data and metadata DB 12. The video data and metadata DB 12 receives the object movement information and the video data transmitted by the object movement information acquisition part 11. Then, the video data and metadata DB 12 associates and stores the object movement information and the video data corresponding to the object movement information (step S103).

Through such an operation, the video processing device 1 stores segment regions where a person moves and the sequence of the segment regions as metadata (object movement information). The metadata is stored in association with corresponding video data. Next, an operation on retrieving a video image showing a person moving in desired segment regions in a desired sequence from among the video images stored by the video processing device 1 will be described.

Figure 4:
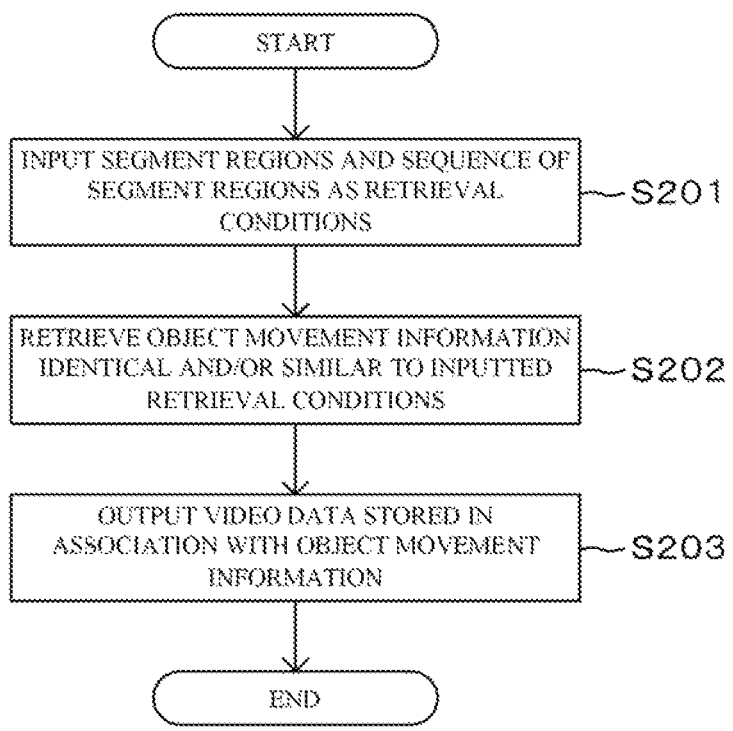
FIG. 4 is a flowchart showing an example of an operation performed when the video processing device according to the first exemplary embodiment of the present invention outputs video data.

Referring to FIG. 4, segment regions showing movement of a retrieval target object to be retrieved and the sequence of the segment regions are inputted into the retrieval condition input part 13 (step S201). Then, the retrieval condition input part 13 into which retrieval conditions have been inputted transmits the retrieval conditions to the metadata check part 14.

Subsequently, the metadata check part 14 receives the retrieval conditions transmitted by the retrieval condition input part 13. Then, the metadata check part 14 uses the received retrieval conditions and retrieves object movement information identical (otherwise, identical and/or similar) to the retrieval conditions from among the object movement information stored by the video data and metadata DB 12 (step S202). After that, the metadata check part 14 acquires video data stored in association with the retrieved object movement information, and outputs the acquired video data to the output device such as the monitor (step S203).

Through such an operation, the video processing device 1 can output video data showing a person moving in desired segment regions in a desired sequence from among the video data stored in the video processing device 1.

The video processing device 1 according to this exemplary embodiment thus includes the object movement information acquisition part 11 and the video data and metadata DB 12. With this configuration, the object movement information acquisition part 11 of the video processing device 1 detects a person moving in a plurality of segment regions in video data acquired from outside, and acquires object movement information composed of movement segment region information and segment region sequence information. Then, the video data and metadata DB 12 stores the object movement information and the video data. In other words, the video processing device 1 can store metadata (object movement information) which indicate segment regions where a person in video data moves and the sequence of the segment regions. Moreover, the video processing device 1 according to this exemplary embodiment includes the retrieval condition input part 13 and the metadata check part 14. This configuration enables input of retrieval conditions composed of segment regions and the sequence of the segment regions into the retrieval condition input part 13, and enables the metadata check part 14 to search metadata (object movement information) stored in the video data and metadata DB 12 based on the retrieval conditions. As a result, it becomes possible to completely retrieve video images of a person or the like moving from a specific region to another specific region without considering a movement path in the regions.

Figure 5:
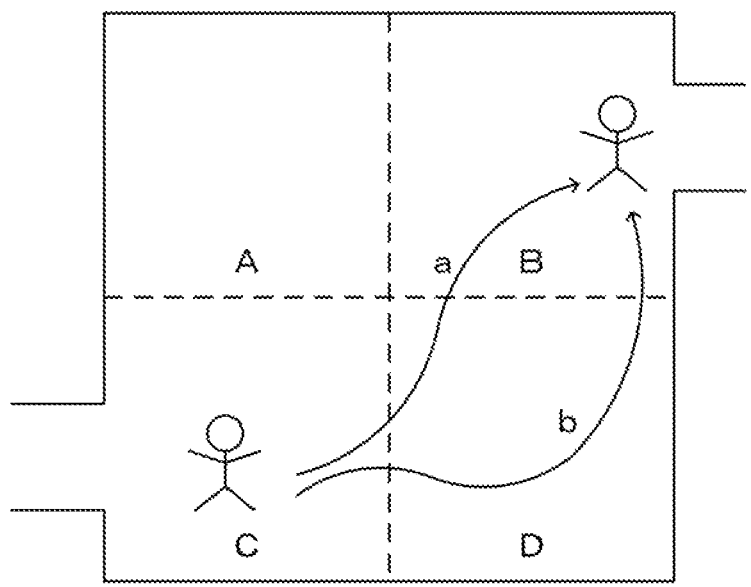
FIG. 5 is a view for describing an operation of the video processing device according to the first exemplary embodiment of the present invention.

For example, in a case where a person in a segment region C shown in FIG. 5 moves to a segment region B, various trajectories such as a route a and a route b are possible. However, according to the present invention, regarding both the route a and the route b, the object movement information acquisition part 11 acquires segment regions and the sequence of the segment regions, namely, metadata (object movement information) representing that the person moves in segment regions C, D and B in the sequence C→D→B. Thus, when segment regions and the sequence of the segment regions are inputted into the retrieval condition input part 13 and retrieval by the metadata check part 14 is performed, it is possible to completely retrieve video images of a person or the like moving from a specific region to another specific region even if movement paths on which the person moving from the specific region to the other specific moves are different, for example, the route a and the route b.

In this exemplary embodiment, the video processing device 1 includes the video data and metadata DB 12. However, the video processing device 1 may be configured to store video data and metadata (object movement information) into separate places.

Further, in this exemplary embodiment, the video processing device 1 is configured to separate a monitoring target area in an image of video data into a plurality of segment regions and then detect a moving person. However, the video processing device 1 may be configured to detect a moving person before separating a monitoring target area into a plurality of segment regions.

Further, the video processing device 1 according to this exemplary embodiment may be configured to, when a detected person is in a given state determined in advance, include information indicating the given state (e.g., trajectory state information) into object movement information. Herein, a given state determined in advance is a given state such as wandering or fast movement. For example, when a detected person is in a given state such as repeatedly moving back and forth in the same segment region, the object movement information acquisition part 11 of the video processing device 1 determines that the detected person is in the wandering state, and adds information indicating the wandering state to object movement information. However, the abovementioned given state is not limited to wandering, fast movement and the like, and a variety of states may be included into object movement information. For example, when a plurality of persons are detected at the same time in the same segment region, object movement information acquired from the respective persons may be associated with each other. Further, (the object movement information acquisition part 11 of) the video processing device 1 may be configured to determine whether or not a person is in a given state for each segment region, for example.

In this exemplary embodiment, the single video processing device 1 includes two means, namely, a video data storing means for acquiring object movement information from video data and storing the object movement information, and a video data retrieving means for retrieving video data. However, the present invention is not limited to the video processing device 1 having such a configuration. For example, the present invention may be realized by two information processing devices, namely, an information processing device including the video data storing means and an information processing device including the video data retrieving means. In this case, the information processing device including the video data retrieving means has, for example: a video data retrieval part which acquires, as retrieval conditions, segment region information of a plurality of segment regions obtained by separating a monitoring target area and sequence information of the passage sequence of a moving object in the segment regions, and retrieves video data of a moving object meeting the acquired retrieval conditions; and a video data output part which outputs the video data acquired by the video data retrieval part. Thus, the present invention may be realized by a plurality of information processing devices.

Further, acquisition of object movement information from video data received from an external device (a video data acquiring means) such as a monitoring camera may be performed at any timing. For example, the object movement information acquisition part 11 may acquire object movement information at the timing of acquisition of video data. Acquisition of object movement information may be performed at the timing of input of retrieval conditions.

Second Exemplary Embodiment

Figure 6:
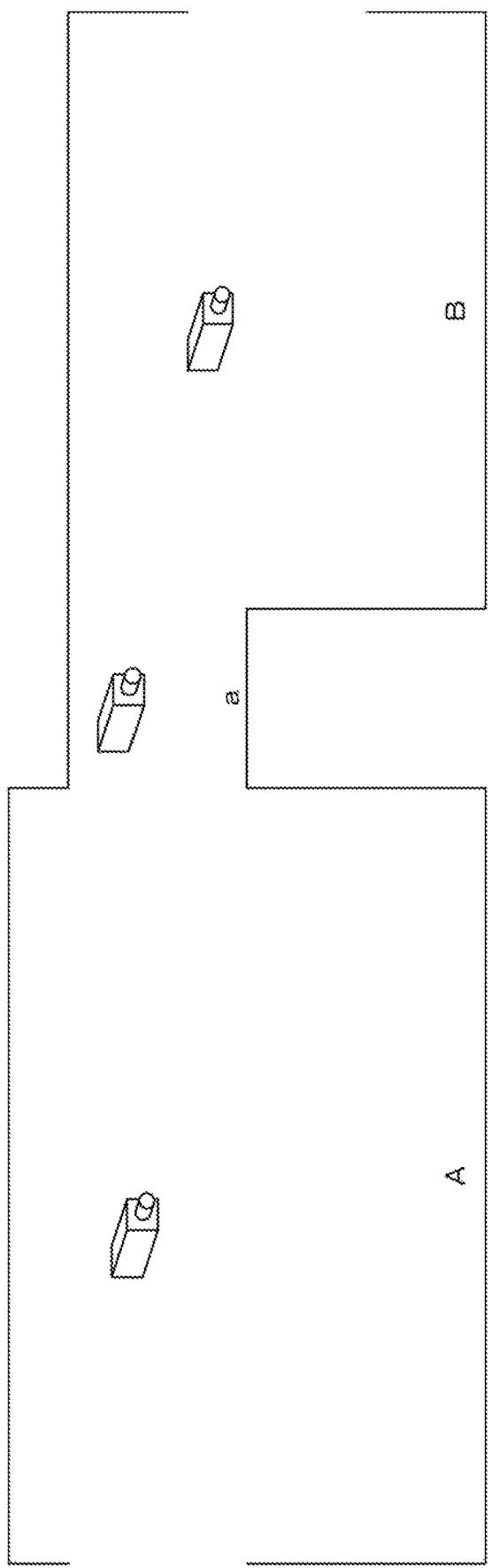
FIG. 6 is a view for describing the overview of a video processing device according to a second exemplary embodiment of the present invention.
Figure 7:
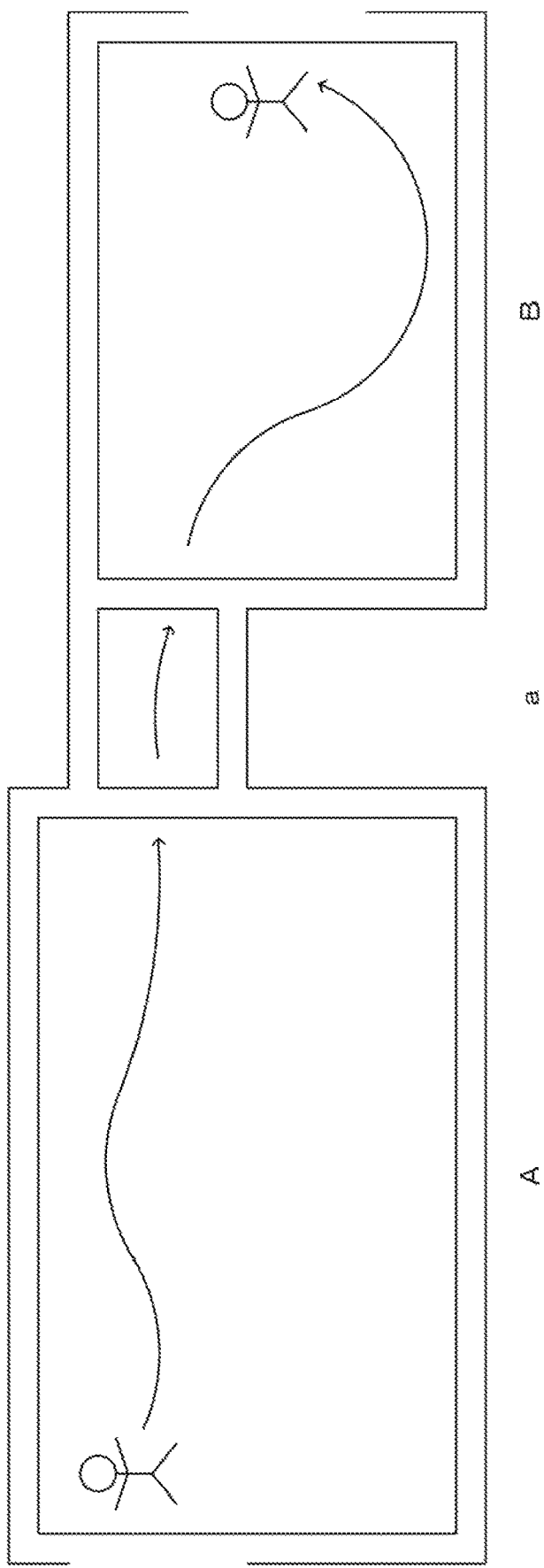
FIG. 7 is a view for describing the overview of the video processing device according to the second exemplary embodiment of the present invention.

Referring to FIGS. 6 and 7, a video processing device 2 according to a second exemplary embodiment of the present invention is a device which stores video images shot by a plurality of monitoring cameras, and retrieves desired video images from among the stored video images and outputs the desired video images to an output device such as a monitor. In specific, a case where the whole shooting ranges of the respective monitoring cameras each form one segment region will be described in this exemplary embodiment. Moreover, a case of acquiring object movement information additionally including the abovementioned given state will be described in detail in this exemplary embodiment.

Figure 8:
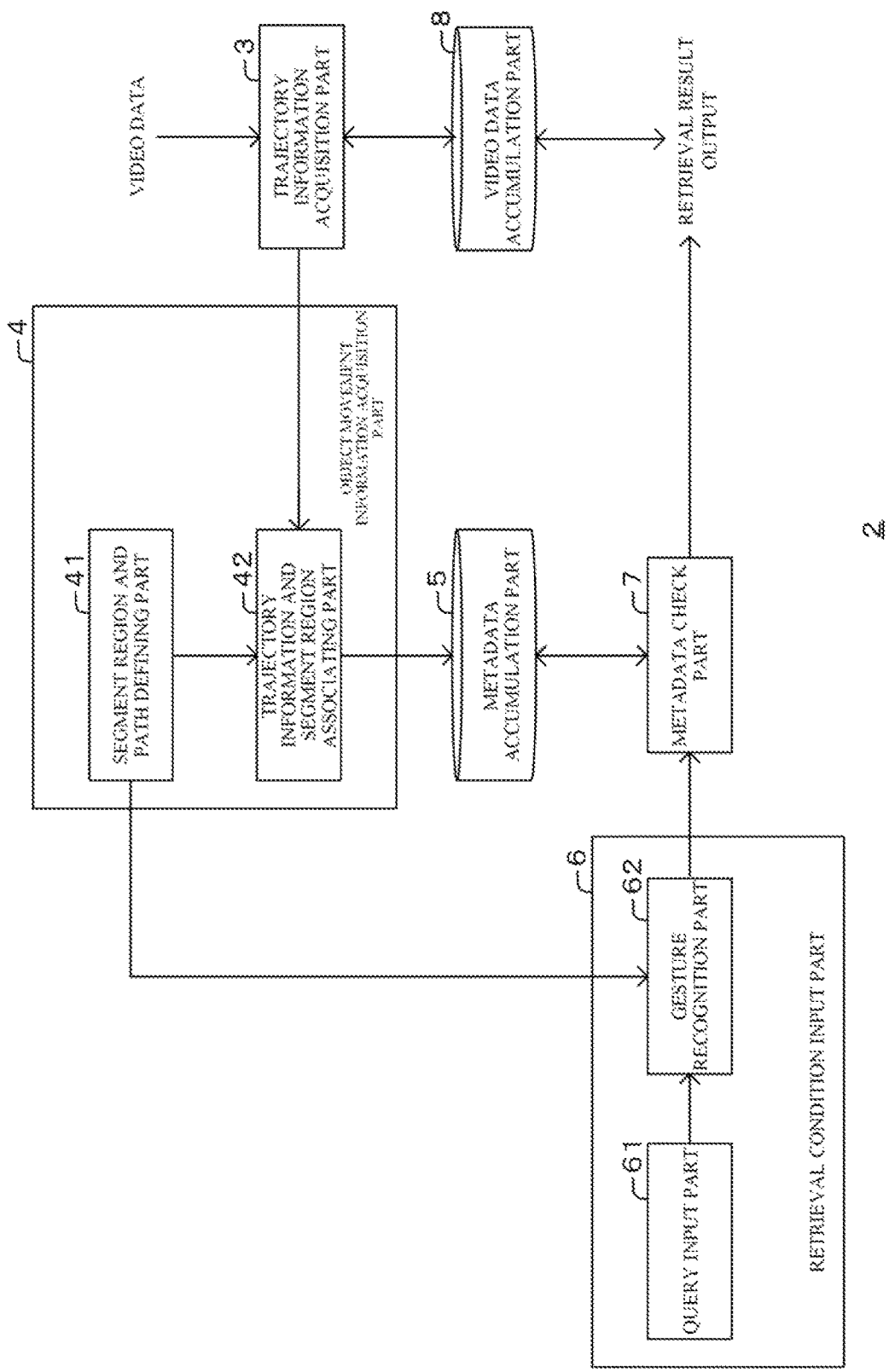
FIG. 8 is a block diagram of the video processing device according to the second exemplary embodiment of the present invention.

Referring to FIG. 8, the video processing device 2 according to the second exemplary embodiment of the present invention has a trajectory information acquisition part 3 (a trajectory information acquiring means), an object movement information acquisition part 4, a metadata accumulation part 5, a retrieval condition input part 6, a metadata check part 7, and a video data accumulation part 8. The object movement information acquisition part 4 has a segment region and path defining part 41, and a trajectory information and segment region associating part 42. The retrieval condition input part 6 has a query input part 61 and a gesture recognition part 62. Herein, the video processing device 2 is an information processing device including an arithmetic device and a storage device. The video processing device 2 realizes the respective functions described above by execution of a program stored in the storage device by the arithmetic device.

Figure 9:
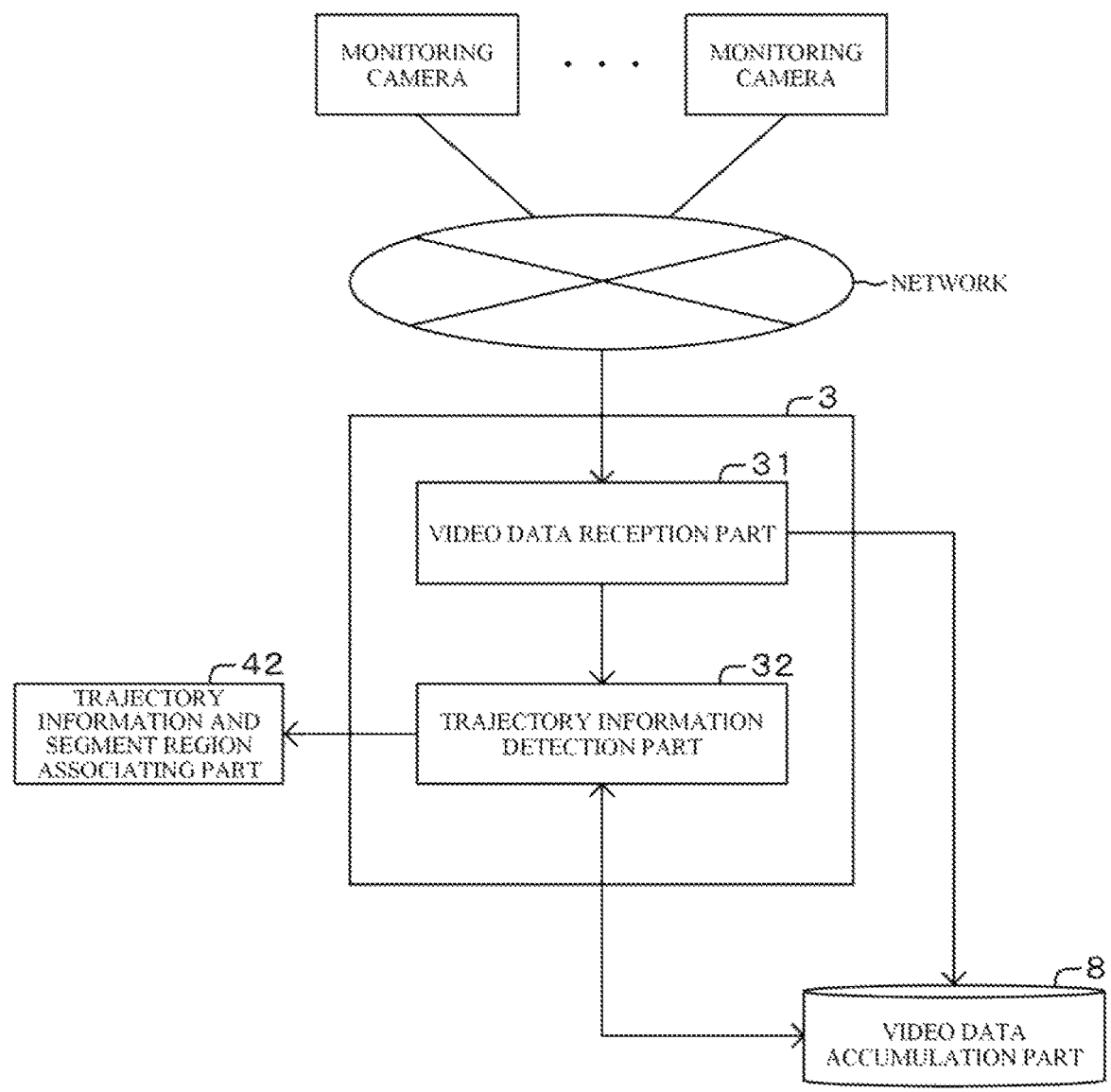
FIG. 9 is a block diagram for describing the configuration of a trajectory information acquisition part shown in FIG. 8.

The trajectory information acquisition part 3 has a function of acquiring a plurality of video data from outside and detecting the trajectory of a person moving in the plurality of video data. Referring to FIG. 9, the trajectory information acquisition part 3 has a video data reception part 31 and a trajectory information detection part 32.

The video data reception part 31 has a function of receiving video data from an external device such as a monitoring camera. As shown in FIG. 9, in this exemplary embodiment, a plurality of monitoring cameras are installed at given positions, and the plurality of monitoring cameras are connected to the video data reception part 31 via an external network. Therefore, the video data reception part 31 acquires video images shot by the plurality of monitoring cameras installed at the given positions via the external network. Then, the video data reception part 31 executes preprocessing which is necessary for detection of trajectory information by the trajectory information detection part 32, and then, transmits the plurality of video data to the trajectory information detection part 32.

The video data reception part 31 also has a function of transmitting received video data to the video data accumulation part 8. As described later, video data transmitted to the video data accumulation part 8 is used at the time of output of video data to the output device.

The trajectory information detection part 32 has a function of detecting a person moving in video data of a plurality of spots shot by the monitoring cameras installed at the plurality of spots, and detecting the trajectory of the detected person. As described above, in this exemplary embodiment, the whole image of a video shot by one monitoring camera is considered as one segment region. Therefore, the trajectory information detection part 32 detects a person moving in a plurality of segment regions, and detects the trajectory of the person moving in the plurality of segment regions.

The trajectory information detection part 32 receives video data transmitted by the video data reception part 31. Otherwise, the trajectory information detection part 32 acquires video data accumulated in the video data acquisition part 8. Then, the trajectory information detection part 32 detects a person moving in video data of a plurality of spots by using the video data received from the video data reception part 31 and video data acquired from the video data accumulation part 8.

For example, referring to FIG. 7, the trajectory information detection part 32 acquires video data A, video data a, and video data B. Then, the trajectory information detection part 32 detects the same person moving in the video data A, the video data a, and the video data B. A person moving in a plurality of video data can be detected by using a variety of techniques. For example, it is possible to: perform face recognition of persons and detect persons from who the same data is obtained as the same person; or recognize as the same person by clothes recognition. In other words, when persons recognized to have the same faces or be in the same clothes appear in the respective video data A, a and B, the trajectory information detection part 32 recognizes, as the same person, the persons recognized to have the same faces or be in the same clothes appearing in the respective video data A, a and B. Alternatively, it is also possible to previously determine a general elapsed time for passing through one image and then appearing in another image and, when a person satisfying the previously determined elapsed time is detected, recognize as the same person, for example. Other than the abovementioned methods, a variety of general methods may be used.

Then, the trajectory information detection part 32 detects, as trajectory information, the trajectory of a person moving in a plurality of video data detected by the abovementioned method. Detection of the trajectory of a person by the trajectory information detection part 32 can also be performed by using a variety of techniques. For example, it is possible to extract the same person from the respective image frames of a plurality of video data, and connect the extracted persons with a line. Other than the abovementioned methods, a variety of general methods may be used.

Thus, the trajectory information detection part 32 detects a person moving in a plurality of video data, and detects the trajectory of the person moving in the plurality of video data as trajectory information. Then, the trajectory information detection part 32 transmits the detected trajectory information to the trajectory information and segment region associating part 42.

In this exemplary embodiment, a case of acquiring three video data and detecting a person moving in the three video data (in three segment regions) has been described referring to FIG. 7. However, the trajectory information detection part 32 is not limited to the abovementioned case, and can acquire a plurality of video data and detect a person moving in a plurality of video data, for example, acquire four video data and detect a person moving in two of the four video data.

Trajectory information includes information for identifying video data from which the trajectory information is detected. Trajectory information may further include information for recognizing a part which shows a person moving in a segment region and is indicated by trajectory information in each of a plurality of video data. Trajectory information may include time information indicating time when a person passes through each spot on a trajectory indicated by the trajectory information (e.g., a movement start spot and a movement end spot in each segment region), and place information indicating the shooting place of a video data from which the trajectory information is acquired (indicating the place of a segment region).

The object movement information acquisition part 4 has a function of using trajectory information and acquiring object movement information composed of movement segment region information and segment region sequence information. As mentioned above, the object movement information acquisition part 4 has the segment region and path defining part 41 and the trajectory information and segment region associating part 42.

The segment region and path defining part 41 has a function of generating segment region and path information which defines segment regions and path information indicating connection of the segment regions. In other words, the segment region and path defining part 41 generates segment region and path information composed of segment regions as a plurality of video data and path information indicating connection of the segment regions. Then, the segment region and path defining part 41 transmits the generated segment region and path information to the trajectory information and segment region associating part 42 and the retrieval condition input part 6. Segment region and path information may be defined in advance. As mentioned above, in this exemplary embodiment, the segment region and path defining part 41 defines each of the whole shooting ranges of the respective monitoring cameras as one segment region. Moreover, connection of places shot by the respective monitoring cameras is defined as path information.

The trajectory information and segment region associating part 42 has a function of using trajectory information and segment region and path information to acquire object movement information. In other words, the trajectory information and segment region associating part 42 associates trajectory information with segment region and path information, and thereby acquires, as object movement information, movement segment region information indicating segment regions where a person indicated by a trajectory moves and segment region sequence information indicating the sequence of the segment regions corresponding to the movement of the person. In this exemplary embodiment, as mentioned above, the whole shooting ranges of the plurality of monitoring cameras are each defined as one segment region. Therefore, referring to FIG. 7 as an example, the trajectory information and segment region associating part 42 acquires object movement information corresponding to the shooting ranges of the respective video data and indicating that a person passes through the segment regions A, a and B in the sequence A→a→B.

The trajectory information and segment region associating part 42 also has a function of determining whether or not the state of a trajectory in each segment region is a given state determined in advance. In other words, after associating the trajectory information with the segment region and path information, the trajectory information and segment region associating part 42 determines whether or not the trajectory in each of the segment regions is a given state determined in advance.

Figure 10:
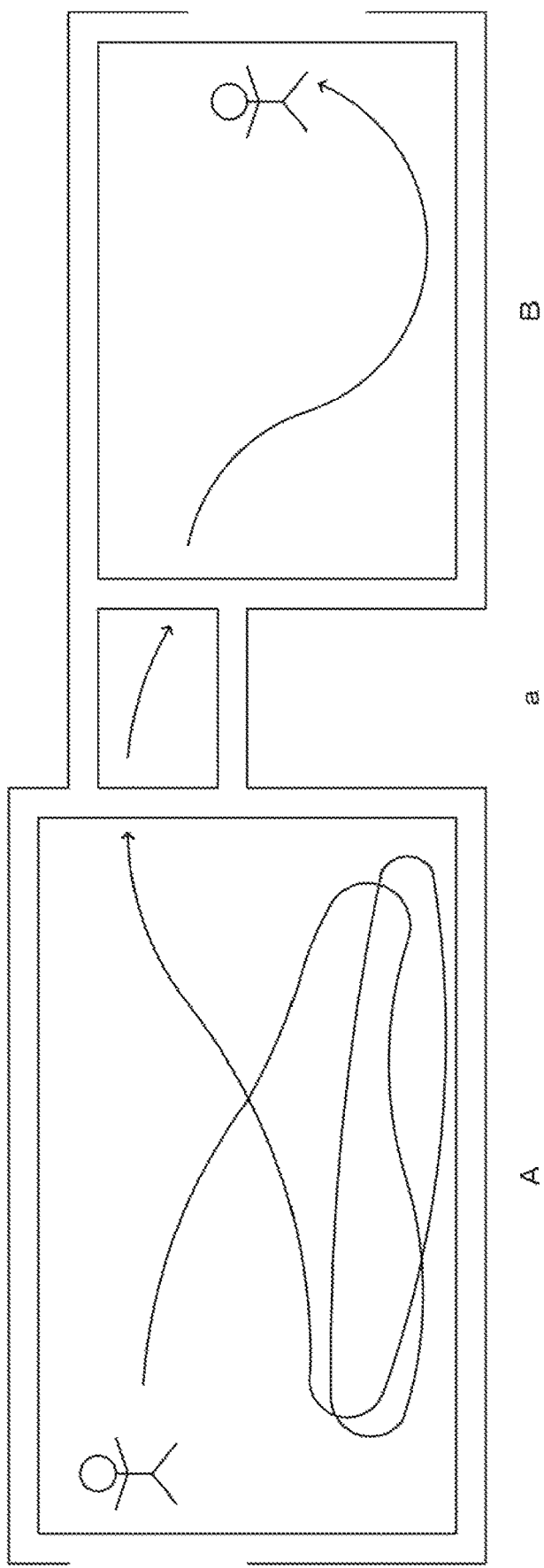
FIG. 10 is a view for describing the state of a trajectory determined by a trajectory information and segment region associating part.

Herein, a given state determined in advance is a given state such as wandering or fast movement. Referring to FIG. 10 as an example, it is found that a detected person repeatedly moves back and forth in the segment region A. Thus, when the state of a trajectory indicated by trajectory information in a segment region (in the segment region A in FIG. 10) is a given state such as a state where a person moves back and forth a specified number of times or more or a state where a person stays in the segment region for a given time or more, the trajectory information and segment region associating part 42 determines that the person is in the wandering state. Then, the trajectory information and segment region associating part 42 acquires object movement information additionally including information (trajectory state information) indicating that the trajectory in the segment region A is in the wandering state.

Other than the wandering state, when a trajectory indicated by trajectory information of a segment region shows a state that a person passes fast through the segment region, the trajectory information and segment region associating part 42 can add information indicating a fast movement state (trajectory state information) to object movement information. For example, by using segment regions, trajectory information, and time information, the trajectory information and segment region associating part 42 can determine whether or not a trajectory (movement of a person) in the segment region is fast.

Besides, in a case where a plurality of trajectories exist at the same time in the same segment region, the trajectory information and segment region associating part 42 can associate trajectory information indicating the trajectories with each other. In other words, the trajectory information and segment region associating part 42 can add information which associates trajectory information indicating trajectories existing at the same time in the same segment region with each other, to corresponding object movement information. The trajectory information and segment region associating part 42 can also add information including the states of the trajectories to the object movement information. Referring to FIG. 11 as an example, it is found that a plurality of persons are moving together. Then, in a case where the trajectories of the plurality of persons are within a predetermined distance, the trajectory information and segment region associating part 42 adds information representing that the persons are moving together (trajectory state information) to the respective object movement information. Further, referring to FIG. 12 as an example, it is found that a plurality of persons are moving separately in the segment region A. Then, in a case where the trajectories of the plurality of persons in the section A are apart a predetermined distance or more, the trajectory information and segment region associating part 42 adds information representing that the persons are moving separately in the segment region A (trajectory state information) to the respective object movement information.

The trajectory information and segment region associating part 42 can also add information including the direction of a trajectory to object movement information. Although the examples of trajectory state information have been described above, the present invention allows addition of a variety of trajectory states other than the abovementioned ones to object movement information.

Thus, the trajectory information and segment region associating part 42 acquires not object movement information indicating only a trajectory in each segment region but object movement information additionally including trajectory state information indicating a given state of the trajectory when the trajectory is in the given state. The trajectory information and segment region associating part 42 determines whether or not a trajectory is in a given state, for each segment region.

Object movement information includes information for identifying a plurality of video data included in trajectory information from which the object movement information is acquired. Object movement information may also include time information and place information.

As described above, the trajectory information and segment region associating part 42 acquires object movement information (metadata) by using trajectory information and segment region and path information. Then, the trajectory information and segment region associating part 42 transmits the trajectory information and the object movement information to the metadata accumulation part 5. Meanwhile, the trajectory information and segment region associating part 42 may be configured to transmit only the object movement information to the metadata accumulation part 5.

The metadata accumulation part 5 is configured by, for example, a storage device such as a hard disk or a RAM (Random Access Memory), and stores trajectory information and object movement information. In other words, the metadata accumulation part 5 receives trajectory information and object movement information transmitted from the trajectory information and segment region associating part 42. Then, the metadata accumulation part 5 stores the received trajectory information and object movement information. After that, the metadata accumulation part 5 transmits the object movement information (metadata) stored thereby in response to a request by the metadata check part 7 as described later. In a case where the trajectory information and segment region associating part 42 is configured to transmit only the object movement information, the metadata accumulation part 5 stores only the object movement information.

The retrieval condition input part 6 has a function of inputting segment regions and the sequence of the segment regions, as retrieval conditions. As mentioned above, the retrieval condition input part 6 has the query input part 61 and the gesture recognition part 62.

The query input part 61 has a function of inputting a query for retrieving object movement information (metadata) stored in the metadata accumulation part 5 and generating query information based on the query. The query input part 61 in this exemplary embodiment has a touchscreen, and a query is inputted by drawing a line on a background corresponding to a segment region displayed on the touchscreen.

Herein, query information indicates an input of a line or successive dots. Although a touchscreen is used to input a line in this exemplary embodiment, it is also possible to use a variety of items which can depict a line other than the touchscreen. For example, it is possible to use a mouse. Then, as described later, an inputted line, the direction of drawing the line, the number of strokes with which a connected line is written, and the number of the drawn lines are collected as query information.

For example, as mentioned above, input of query information through the query input part 61 is conducted by drawing a line on the background corresponding to a segment region displayed on the touchscreen. In other words, the user selects a range or the like (a segment region) where the user wants to input query information (wants to conduct retrieval), as the background. Then, the user draws a line in the selected range (otherwise, draws in part of the displayed background). Moreover, the user then conducts a given operation determined in advance, thereby inputting trajectory state information. Trajectory state information is determined for each segment region. Therefore, necessary trajectory state information is inputted into the query input part 61 for each trajectory information.

Figure 13A:
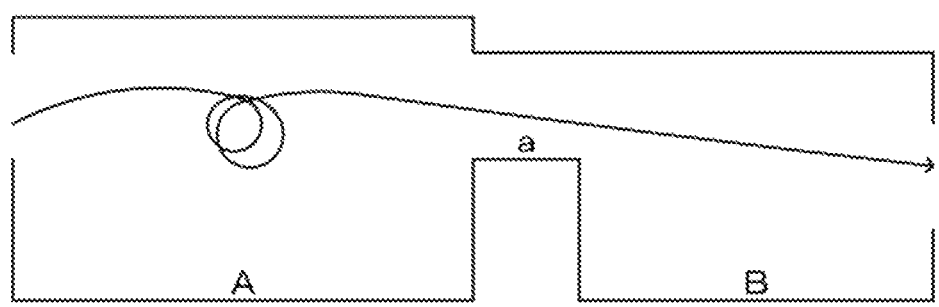
FIGS. 13A-13E are view showing example of trajectory state information inputted into a query input part.
Figure 13B:
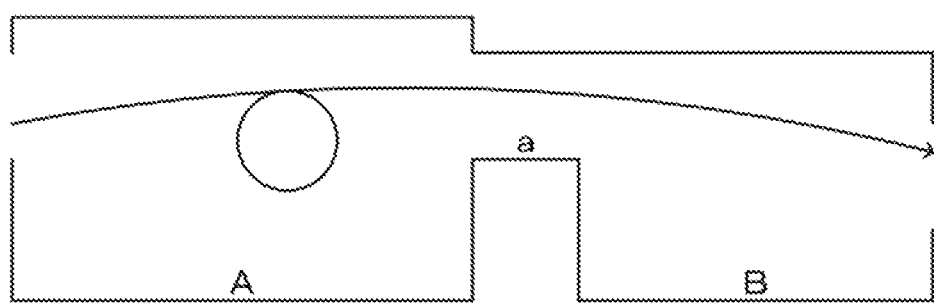
Figure 13C:
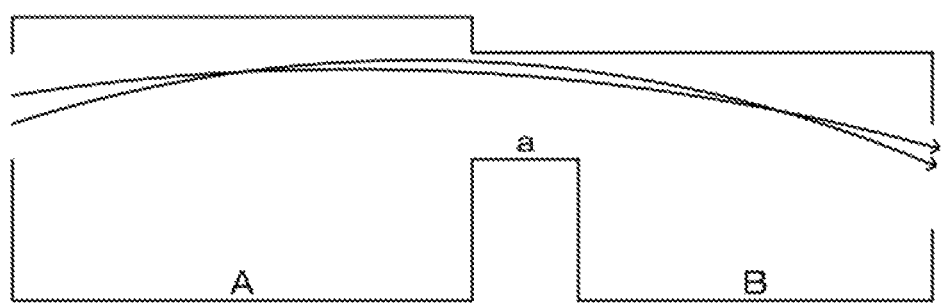
Figure 13D:
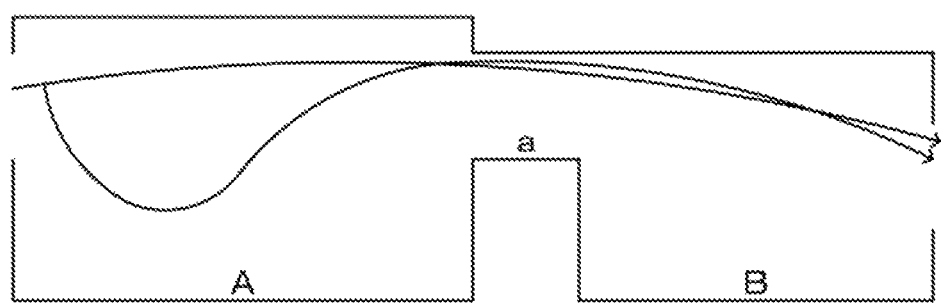
Figure 13E:
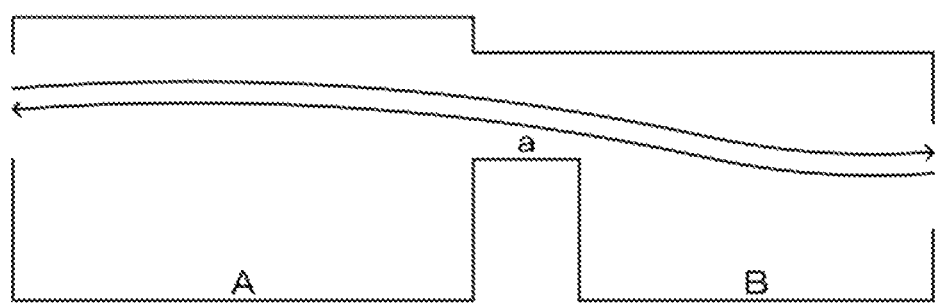

An example of a given operation performed when inputting trajectory state information into the query input part 61 will be described. FIGS. 13A to E will be referred to. FIG. 13A shows an operation performed when inputting trajectory state information representing that a person is wandering. FIG. 13B shows an operation performed when inputting trajectory state information representing that a person is moving fast. FIG. 13C shows an operation performed when inputting trajectory state information representing that a plurality of persons are moving together. FIG. 13D shows an operation performed when inputting trajectory state information representing that a plurality of persons are moving separately in a segment region A and moving together in segment regions a and B. FIG. 13E shows an operation performed when inputting trajectory state information representing that there is a person moving in the opposite direction.

As shown in FIG. 13A, for inputting trajectory state information representing that a person is wandering, a line is drawn circularly several times, for example. By thus inputting, as described later, it is possible to input trajectory state information representing that a person is wandering in a segment region (the segment region A in FIG. 13A) including a part where the line is drawn circularly several times. Moreover, as shown in FIG. 13B, for inputting trajectory state information representing that a person is moving fast, a line is drawn circularly one time, for example. By thus inputting, it is possible to input trajectory state information representing that a person is moving fast in a segment region (the segment region A in FIG. 13B) including a part where the line is drawn circularly one time. Moreover, as shown in FIG. 13C, by drawing a plurality of lines close to each other, it is possible to input trajectory state information representing that a plurality of persons are moving together. Moreover, as shown in FIG. 13D, by separating the plurality of lines as drawn in FIG. 13C at a predetermined interval or more, it is possible to input trajectory state information representing that a plurality of persons are moving separately in a segment region including a part where the plurality of lines are drawn at the predetermined interval or more. Moreover, as shown in FIG. 13E, by drawing a line directing in the opposite direction, it is possible to input trajectory state information representing that there is a person moving in the opposite direction.

Figure 14:
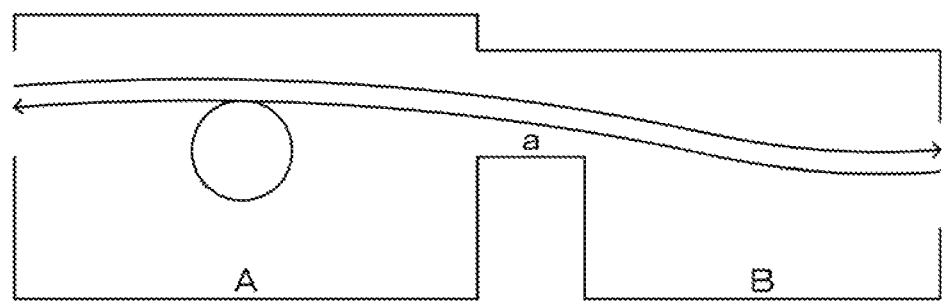
FIG. 14 is a view showing an example of trajectory state information inputted into the query input part.

In a query inputted into the query input part 61, the direction is determined based on the drawing order. Moreover, the abovementioned queries can be combined with each other. For example, referring to FIG. 14, it is possible to draw a state where a person moving in the opposite direction is moving fast.

Further, it is possible to use an AND condition and an OR condition by drawing with a single stroke and drawing with two or more strokes. For example, referring to FIG. 15, inputting a query with a single stroke is drawing a state where a person moves fast in the segment region A and also moves fast in the segment region B. On the other hand, inputting a query with two strokes is drawing a state where a person moves fast in the segment region A or moves fast in the segment region B. Alternatively, an AND condition and an OR condition may be depicted by, for example, drawing with three or more strokes, or drawing with a single stroke multiple times to draw a plurality of queries.

By thus drawing a specific figure in line drawing, it is possible to input trajectory state information. However, the present invention may be practiced not limited to input of trajectory state information by the abovementioned method. For example, it is possible to employ a variety of methods such as select desired trajectory state information from a menu displayed when stopping drawing for a given time in line drawing.

The query input part 61 to which query information has been inputted by the abovementioned method transmits the query information to the gesture recognition part 62.

The gesture recognition part 62 has a function of associating query information received from the query input part 61 with segment region and path information received from the segment region and path defining part 41 and thereby recognizing trajectory state information (a gesture) expressed by a query for each segment region. The gesture recognition part 62 also has a function of associating the query information with the segment region and path information and thereby acquiring segment regions where the query passes and the sequence of the segment regions (as retrieval conditions).

In other words, the gesture recognition part 62 uses query information and segment region and path information and thereby acquire gesture information representing trajectory state information (a gesture) for each segment region, segment regions, and the sequence of the segment regions. Then, the gesture recognition part 62 transmits the acquired retrieval conditions to the metadata check part 7.

Figure 16:
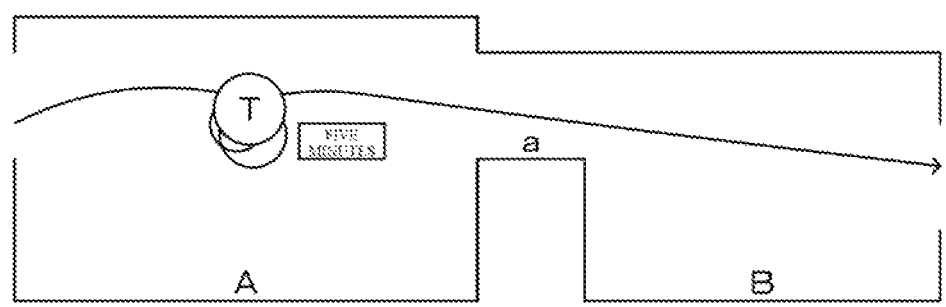
FIG. 16 is a view showing an example of feedback of a gesture recognized by a gesture recognition part.

The gesture recognition part 62 may have a function of feeding back a gesture recognized by the gesture recognition part 62. To be specific, the gesture recognition part 62 may cause the query input part 61 including a display function to display a mark or a symbol associated with each gesture set in advance. For example, in a case where an input and an output are the same as shown in FIG. 16 (for example, in a case where the background and the drawn line are displayed on the touchscreen), for a line drawn by the user (as query information), a symbol indicating wandering is displayed on the touchscreen as the of recognition of a gesture by the gesture recognition part 62. Besides, for example, it is possible to configure so that the user can tap the displayed symbol and thereby input detailed information on the state of the trajectory corresponding to the symbol (in FIG. 16, the wandering state). For example, in FIG. 16, the range of a wandering time is designated.

The metadata check part 7 has a function of retrieving object movement information (metadata) stored in the metadata accumulation part 5 based on a retrieval condition received from the retrieval condition input part 6. The metadata check part 7 may also have a function of acquiring video data relating to the retrieved object movement information from the video data accumulation part 8 and outputting the retrieval result to an output device such as a monitor.

The metadata check part 7 receives a retrieval condition from the retrieval condition input part 6. Then, the metadata check part 7 retrieves object movement information stored in the metadata accumulation part 5 by using the received retrieval condition. After that, the metadata check part 7 acquires video data relating to the retrieved object movement information (video data in which a person indicated by the object movement information is recorded) from the video data accumulation part 8, and transmits the acquired video data to an output device such as a monitor.

Herein, the metadata check part 7 may be configured to retrieve only object movement information identical to the retrieval condition from the metadata accumulation part 5, for example. The metadata check part 7 may be configured to retrieve object movement information identical and/or similar to the retrieval condition from the metadata accumulation part 5, for example.

Determination of similarity by the metadata check part 7 may be performed by the same configuration as already described. The metadata check part 7 may also be configured to determine similarity in consideration of trajectory state information.

The video data accumulation part 8 is configured by, for example, a storage device such as a hard disk and a RAM (Random Access Memory), and stores video data. In other words, the video data accumulation part 8 receives video data transmitted from the video data reception part 31. Then, the video data accumulation part 8 stores the received video data. After that, the video data accumulation part 8 transmits video data corresponding to object movement information to the output device in response to a request by the metadata check part 7 to be described later.

That is the configuration of the video processing device 2. With the abovementioned configuration, the video processing device 2 can retrieve a video image showing a person moving in desired segment regions in a desired sequence from among the stored video images. Next, an operation of the video processing device 2 according to this exemplary embodiment will be described.

An operation performed when acquiring object movement information (metadata) from video data acquired from outside, for example, from a monitoring camera and storing the object movement information and the video data will be described.

Figure 17:
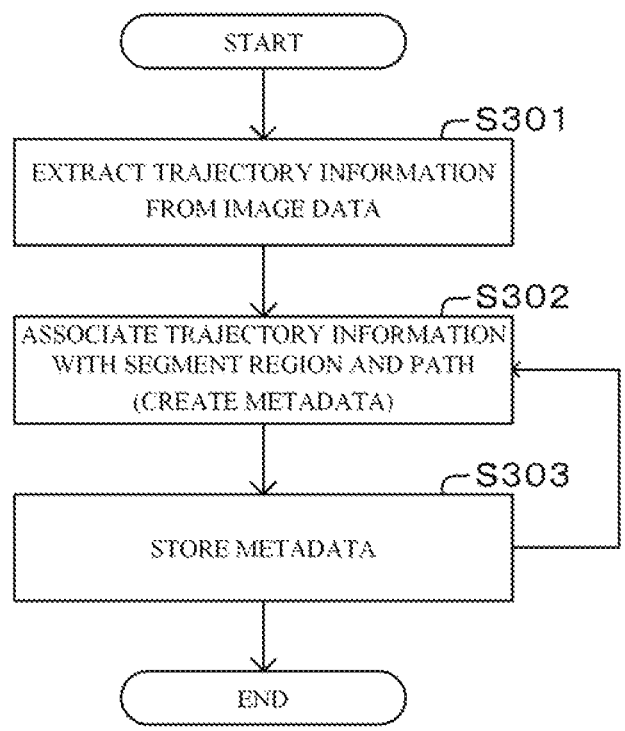
FIG. 17 is a flowchart showing an example of an operation performed when the video processing device according to the second exemplary embodiment of the present invention stores object movement information.

When the video data reception part 31 of the video processing device 2 receives video data via an external network from a plurality of monitoring cameras installed at external given positions, execution of a process shown in FIG. 17 is started. The video data reception part 31 transmits the received video data of the plurality of spots to the trajectory information detection part 32. Then, the trajectory information detection part 32 detects a person moving in the video data of the plurality of spots and detects the trajectory of the detected person. Consequently, the trajectory information detection part 32 detects trajectory information indicating the trajectory of the person moving in the video data of the plurality of spots (step S301).

Subsequently, the trajectory information detection part 32 transmits the detected trajectory information to the trajectory information and segment region associating part 42. Also, segment region and path information defined by the segment region and path defining part 41 is transmitted to the trajectory information and segment region associating part 42. Then, the trajectory information and segment region associating part 42 associates the trajectory information with the segment region and path information and thereby acquires object movement information (creates metadata) (step S302). Herein, object movement information includes segment regions, the sequence of the segment regions, and trajectory state information of each of the segment regions.

Subsequently, the trajectory information and segment region associating part 42 transmits the object movement information to the metadata accumulation part 5. After that, the metadata accumulation part 5 stores the object movement information as metadata (step S303).

By performing the abovementioned operation, the video processing device 2 stores segment regions where a person moves, the sequence of the segment regions, and trajectory state information of each of the segment regions, as metadata (object movement information). The metadata is stored in association with corresponding video data. Next, an operation performed when retrieving a video image showing a person moving in desired segment regions in a desired sequence from among video images stored in the video processing device 2.

Figure 18:
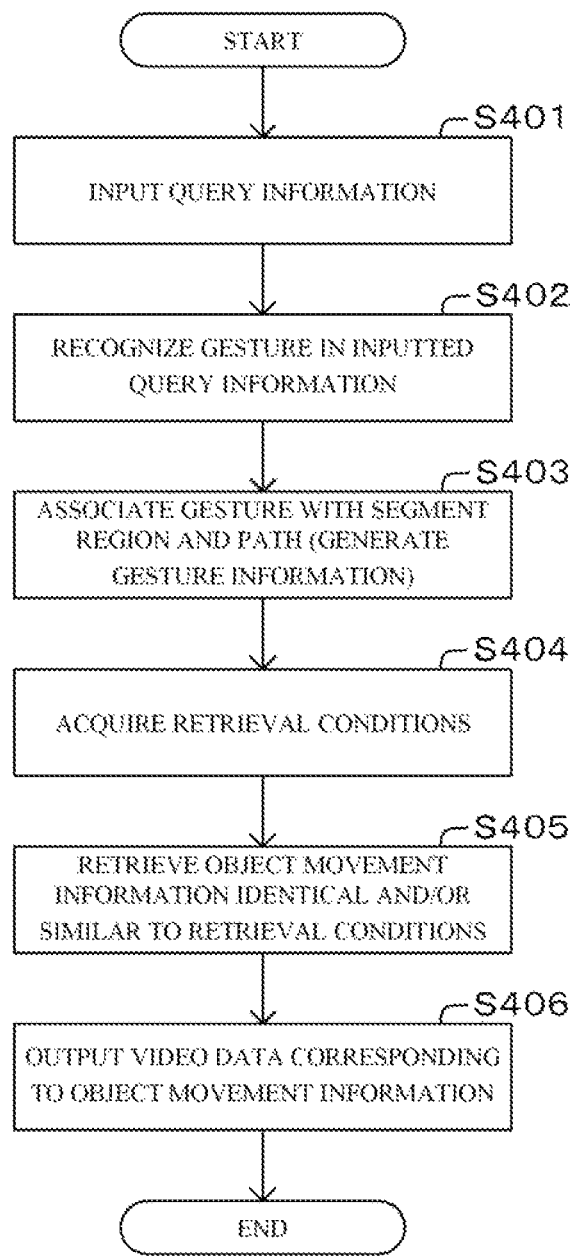
FIG. 18 is a flowchart showing an example of an operation performed when the video processing device according to the second exemplary embodiment of the present invention outputs video data.

Referring to FIG. 18, query information is inputted into the query input part 61 of the retrieval condition input part 6 (step S401). Subsequently, the query input part 61 transmits the inputted query information to the gesture recognition part 62.

Next, the gesture recognition part 62 receives the query information. The gesture recognition part 62 also receives segment region and path information from the segment region and path defining part 41. Then, the gesture recognition part 62 reads a predetermined figure from the inputted query information, and recognizes a gesture included in the query information (step S402). Moreover, the gesture recognition part 62 associates the recognized gesture with the segment region and path information and thereby acquires gesture information for each segment region (step S403). Furthermore, the gesture recognition part 62 associates the query information with the segment region and path information and thereby acquires segment regions where the query passes and the sequence of the segment regions (as retrieval conditions). Consequently, the gesture recognition part 62 acquires retrieval conditions composed of the segment regions, the sequence of the segment regions, and the gesture (object movement information) of each of the segment regions (step S404). Then, the gesture recognition part 62 transmits the acquired retrieval conditions to the metadata check part 7. Acquisition of segment regions and the sequence of the segment regions by the gesture recognition part 62 may be performed before acquisition of gesture information.

After that, the metadata check part 7 receives the retrieval conditions transmitted by the gesture recognition part 62. Then, the metadata check part 7 retrieves object movement information identical and/or similar to the retrieval conditions from among the object movement information stored in the metadata accumulation part 5 (step S405). Then, the metadata check part 7 acquires video data corresponding to the retrieved object movement information from the video data accumulation part 8, and outputs the acquired video data to an output device such as a monitor (step S406).

By performing such an operation, the video processing device 2 can output video data showing a person moving in desired segment regions in a desired sequence from among video data stored in the video processing device 2.

As described above, the video processing device 2 according to this exemplary embodiment includes the trajectory information acquisition part 3, the object movement information acquisition part 4, the metadata accumulation part 5, the retrieval condition input part 6, the metadata check part 7, and the video data accumulation part 8. According to this configuration, the trajectory information acquisition part 3 of the video processing device 2 detects a person moving in a plurality of video data and detects the trajectory of the moving person. Then, the object movement information acquisition part 4 of the video processing device 2 can acquire object movement information based on the detected trajectory and store the object movement information into the metadata accumulation part 5. Moreover, by input of a retrieval condition into the retrieval condition input part 6, the metadata check part 7 of the video processing device 2 can search the object movement information stored by the accumulation part 5. This configuration enables retrieval under inputted retrieval conditions composed of segment regions and the sequence of the segment regions, and allows complete retrieval of video images showing a person or the like moving from a specific region to another specific region without considering a movement path in the regions.

Further, the video processing device 2 according to this exemplary embodiment includes the segment region and path defining part 41, the trajectory information and segment region associating part 42, the query input part 61, and the gesture recognition part 62. This configuration enables the trajectory information and segment region associating part 42 to acquire the state of a trajectory for each segment region defined by the segment region and path defining part 41. Moreover, by input of a query additionally including the state of a trajectory into the query input part 61, the gesture recognition part 62 can acquire the state of a trajectory of each segment region. This configuration enables retrieval of proper video data with addition of the state of a trajectory in each segment region.

Third Exemplary Embodiment

In this exemplary embodiment, a case where the segment region and path defining part 41 defines segment regions in a different way from in the second exemplary embodiment will be described.

A video processing device in this exemplary embodiment has the same configuration as in the second exemplary embodiment. Description of each component has already been made, and therefore, will be omitted hereinafter.

Figure 19:
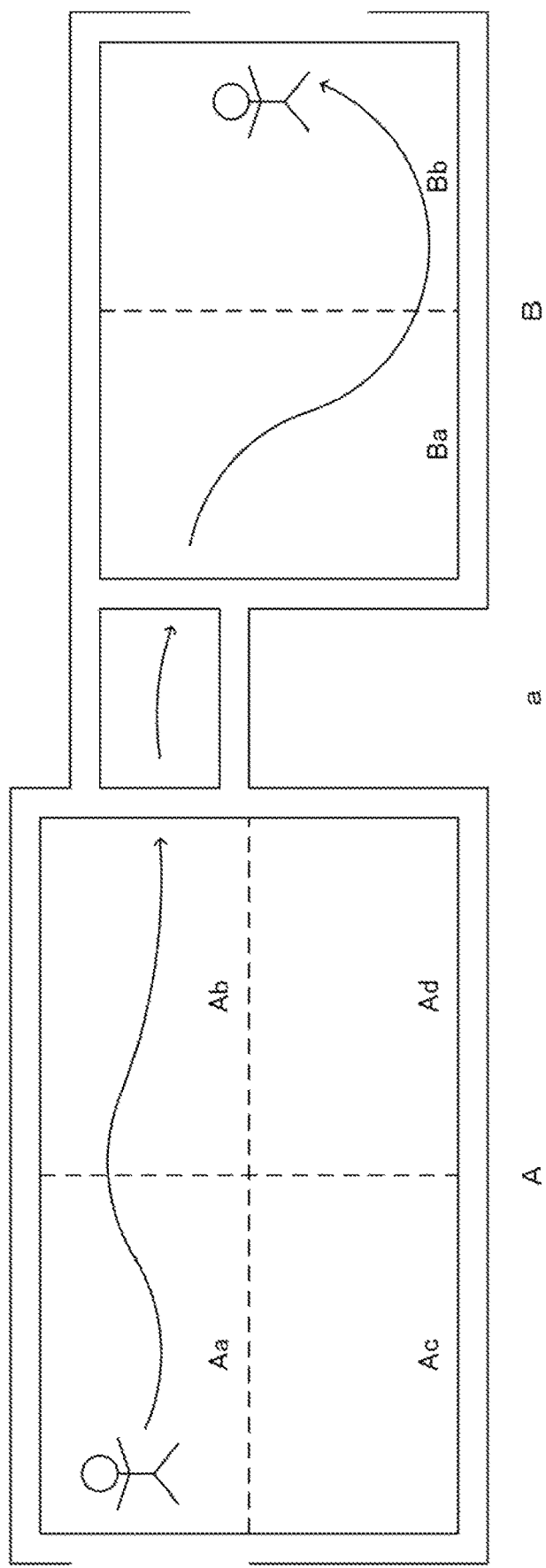
FIG. 19 is a view for describing segment regions separated by a video processing device according to a third exemplary embodiment of the present invention.

Referring to FIG. 19, the video processing device in this exemplary embodiment acquires a plurality of video data. In this exemplary embodiment, the segment region A is separated into four segment regions Aa, Ab, Ac and Ad, and the segment region B is separated into two segment regions Ba and Bb.

As illustrated in this exemplary embodiment, the segment region and path defining part 41 may be configured not to necessarily define each of the whole shooting ranges of the monitoring cameras as one segment region. For example, the segment region and path defining part 41 may further separate a monitoring target area in an image of one video data into a plurality of segment regions in the same manner as separating the video data A. Moreover, the segment region and path defining part 41 may change, depending on video data, the number of segment regions obtained by separating a monitoring target area in an image of the video data.

Thus, the segment region and path defining part 41 in this exemplary embodiment may be configured to, when separating monitoring target areas in images of a plurality of video data into a plurality of segment regions, further separate the monitoring target area in the image of each of the video data into a plurality of segment regions, instead of setting a segment region for each video data. Consequently, it becomes possible to define segment regions close to the realities, for example, define segment regions in accordance with the frequency of passage of a person.

The definition of segment regions by the segment region and path defining part 41 may be changed in accordance with the magnification of the background displayed on the touchscreen, for example. Referring to FIG. 20 as an example, in a state where the background is reduced, it is assumed that the whole shooting range of each of the monitoring cameras is one segment region (e.g., a monitoring target area is separated into the segment region A, the segment region a, and the segment region B). On the other hand, in a state where the background is enlarged, it is assumed that there are four segment regions including the segment regions Aa, Ab, Ac and Ad (the segment region A in the shrunk state is separated into the segment region Aa, the segment region Ab, the segment region Ac, and the segment region Ad). Thus, the video processing device may be configured so that the object movement information acquisition part 4 generates object movement information (metadata) in accordance with a magnification at which the background can be displayed and stores the metadata into the metadata accumulation part 5 and retrieval can be performed only by manipulating a magnification. This configuration enables detailed trajectory retrieval by segmentation of a segment region. The enlarging/shrinking operation may be performed by any method, for example, by using multi-touch gestures such as pinch in and pinch out or by using enlarging and shrinking buttons.

Next, a video processing system 9 capable of completely retrieving video images of a person or the like moving from a specific region to another specific region will be described. In this exemplary embodiment, the overview of the configuration of the video processing system 9 will be described.

Fourth Exemplary Embodiment

Figure 21:
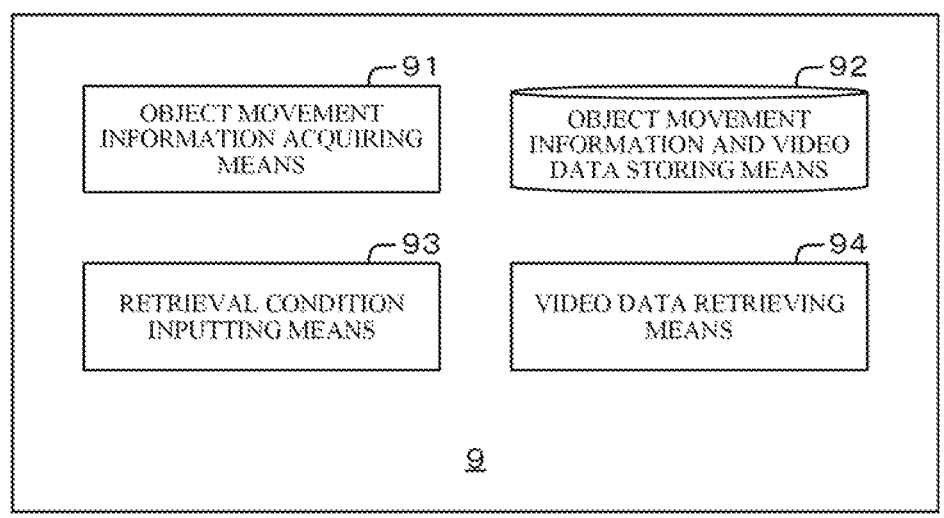
FIG. 21 is a schematic block diagram for describing the overview of the configuration of a video processing system according to a fourth exemplary embodiment of the present invention.

Referring to FIG. 21, the video processing system 9 according to the fourth exemplary embodiment of the present invention has an object movement information acquiring means 91, an object movement information and video data storing means 92, a retrieval condition inputting means 93, and a video data retrieving means 94.

The object movement information acquiring means 91 has a function of acquiring object movement information composed of movement segment region information and segment region sequence information from video data obtained by shooting a monitoring target area. To be specific, the object movement information acquiring means 91 receives video data obtained by shooting a monitoring target area (for example, from one or plural video data acquiring means). Subsequently, the object movement information acquiring means 91 separates the monitoring target area into a plurality of segment regions determined in advance, and detects a person (a moving object) moving in a plurality of segment regions in the video data obtained by shooting the monitoring target area. Then, the object movement information acquiring means 91 acquires, as object movement information, movement segment region information indicating the segment regions where the detected person moves and segment region sequence information indicating the sequence of the segment regions corresponding to the movement of the detected person. After that, the object movement information acquiring means 91 transmits the object movement information to the object movement information and video data storing means 92.

The object movement information acquiring means 91 can acquire single video data and separate a monitoring target area in an image of the acquired video data into a plurality of segment regions. Also, the object movement information acquiring means 91 can acquire a plurality of video data and define each of the shooting ranges of the plurality of video data as a segment region, thereby separating monitoring target areas in images of the plurality of video data into a plurality of segment regions. The object movement information acquiring means 91 can also separate each of the monitoring target areas in the images of the plurality of acquired video data into a plurality of segment regions.

Because the details of segment regions, movement segment region information, segment region sequence information and so on has already been described, description thereof will be omitted. Further, in the same manner as already described, object movement information is configured so that video data corresponding to the object movement information can be retrieved.

For example, the object movement information and video data storing means 92 is configured by a hard disk, or the like. The object movement information and video data storing means 92 has a function of associating and storing object movement information and video data. The object movement information and video data storing means 92 receives object movement information transmitted by the object movement information acquiring means 91. Also, the object movement information and video data storing means 92 receives video data acquired by the object movement information acquiring means 91 via the object movement information acquiring means 91 or the like. Then, the object movement information and video data storing means 92 associates and stores the object movement information and the video data corresponding to the object movement information.

The retrieval condition inputting means 93 has a function of inputting segment regions showing movement of a retrieval target person and the sequence of the segment regions. The retrieval condition inputting means 93 includes an input device such as a touchscreen or a keyboard. Then, through operation of the input device, a retrieval condition is inputted into the retrieval condition inputting means 93. After that, the retrieval condition inputting means 93 transmits the inputted retrieval condition to the video data retrieving means 94.

The video data retrieving means 94 has a function of retrieving object movement information corresponding to a retrieval condition. The video data retrieving means 94 receives retrieval conditions including segment regions and the sequence of the segment regions from the retrieval condition inputting means 93. Subsequently, the video data retrieving means 94 uses the received retrieval conditions to retrieve the object movement information stored in the object movement information and video data storing means 92. Then, the video data retrieving means 94 outputs video data stored in association with the retrieved object movement information to an output device such as a monitor.

The video data retrieving means 94 may be configured to retrieve only object movement information identical to a retrieval condition (the same segment regions and the same sequence) from the object movement information and video data storing means 92. Alternatively, the video data retrieving means 94 may be configured to retrieve object movement information identical and/or similar to a retrieval condition from the object movement information and video data storing means 92.

That is the configuration of the video processing system 9. With the abovementioned configuration, the video processing system 9 can retrieve a video image showing a person moving in desired segment regions in a desired sequence from among video images stored by the object movement information and video data storing means 92. In other words, it becomes possible to completely retrieve video images of a person or the like moving from a specific region to another specific region without considering movement paths in the regions (in the respective segment regions).

Next, a video processing device 10 capable of completely retrieving video images of a person or the like moving from a specific region to another specific region will be described. In this exemplary embodiment, the overview of the configuration of the video processing device 10 will be described.

Fifth Exemplary Embodiment

Figure 22:
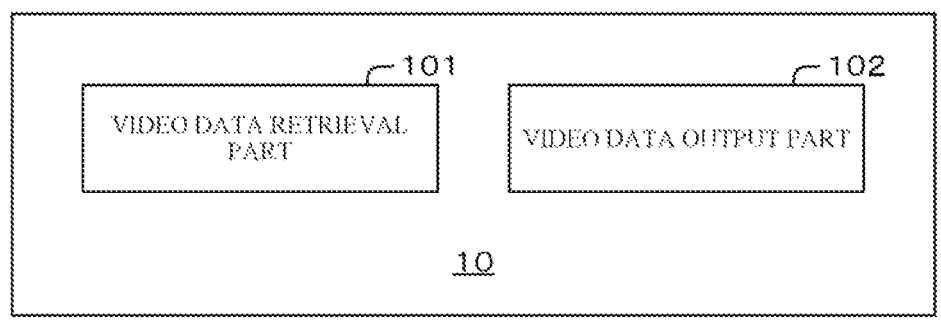
FIG. 22 is a schematic block diagram for describing the overview of the configuration of a video processing device according to a fifth exemplary embodiment of the present invention.

Referring to FIG. 22, the video processing device 10 according to a fifth exemplary embodiment of the present invention has a video data retrieval part 101 and a video data output part 102.

The video data retrieval part 101 has a function of acquiring, as retrieval conditions, segment region information of a plurality of segment regions obtained by dividing a monitoring area and sequence information of the sequence of the segment regions through which a moving object passes, and retrieving video data of the moving object meeting the acquired retrieval conditions. In other words, the video data retrieval part 101 acquires video data from a video data storage part or from outside, and retrieves video data of a moving object meeting retrieval conditions from the acquired video data. Retrieval conditions which are conditions for retrieval performed by the video data retrieval part 101 include segment region information of a plurality of segment regions obtained by dividing a monitoring area and sequence information of the sequence of the segment regions through which a moving object passes The video data output part 102 has a function of outputting video data acquired by the video data retrieval part 101. The video data output part 102 is connected to an external device such as a monitor, and outputs video data to the monitor or the like.

That is the configuration of the video processing device 10. As described above, the video processing device 10 includes the video data retrieval part 101 and the video data output part 102. Retrieval conditions for retrieval performed by the video processing device 10 include segment region information of a plurality of segment regions obtained by dividing a monitoring target area and sequence information of the sequence of the segment regions through which a moving object passes. With this configuration, the video processing device 10 can retrieve video data by using segment region information and sequence information. As a result, the video processing device 10 can completely retrieve video images of a person or the like moving from a specific region to another specific region without considering movement paths in the regions.

Further, the video processing device 10 described above can be realized by installing a given program into the video processing device 10. To be specific, a program as another aspect of the present invention is a computer program for causing the video processing device to function as: a video data retrieval part which acquires, as retrieval conditions, segment region information of a plurality of segment regions obtained by dividing a monitoring target area and sequence information of the sequence of the segment regions through which a moving object passes, and retrieves video data of the moving object meeting the acquired retrieval conditions; and a video data output part which outputs the video data acquired by the video data retrieval part.

Further, a method for video processing executed by operation of the video processing device 10 described above is a method including: acquiring, as retrieval conditions, segment region information of a plurality of segment regions obtained by dividing a monitoring target area and sequence information of the sequence of the segment regions through which a moving object passes, and retrieving video data of the moving object meeting the acquired retrieval conditions; and outputting the retrieved video data.

The inventions of the program and the video processing method having the abovementioned configurations have the same actions as the video processing device 10, and therefore, can achieve the object of the present invention.

SUPPLEMENTARY NOTES

The whole or part of the exemplary embodiments disclosed above can be described as the following supplementary notes. Below, the overview of a video processing device and so on according to the present invention will be described. However, the present invention will not be limited to the following configurations.

(Supplementary Note 1)

A video processing system comprising:

an object movement information acquiring means for detecting a moving object from video data and acquiring movement segment region information as object movement information, the video data being obtained by separating a monitoring target area into a predetermined plurality of segment regions and shooting the monitoring target area, the moving object moving in the plurality of segment regions, the movement segment region information representing segment regions where the detected moving object has moved;

an object movement information and video data storing means for storing the object movement information in association with the video data corresponding to the object movement information, the object movement information being acquired by the object movement information acquiring means;

a retrieval condition inputting means for inputting a sequence of the segment regions as a retrieval condition, the segment regions showing movement of a retrieval target object to be retrieved; and a video data retrieving means for retrieving the object movement information in accordance with the retrieval condition and outputting video data stored in association with the retrieved object movement information, the object movement information being stored by the object movement information and video data storing means, the retrieval condition being inputted by the retrieval condition inputting means.

According to this configuration, the video processing system includes a video data acquiring means, an object movement information acquiring means, a retrieval condition inputting means, and a video data retrieving means. With this configuration, the video processing system can acquire object movement information (metadata) including movement segment region information and segment region sequence information from video data acquired by the video data acquiring means. Moreover, by input of a retrieval condition into the retrieval condition inputting means, the video data retrieving means can retrieve object movement information and output associated video data. As a result, it becomes possible to retrieve video data based on object movement information, and it becomes possible to completely retrieve video images of a person or the like moving from a specific region to another specific region without considering movement paths in the regions.

(Supplementary Note 2)

The video processing system according to Supplementary Note 1, further comprising a trajectory information acquiring means for acquiring a trajectory as trajectory information from the video data, the trajectory being of movement of the moving object in the plurality of segment regions, wherein the object movement information acquiring means acquires the object movement information by associating the trajectory with the predetermined plurality of segment regions, the trajectory being represented by the trajectory information acquired by the trajectory information acquiring means.

According to this configuration, the video processing system includes the trajectory information acquiring means. With this configuration, the video processing system can acquire object movement information based on trajectory information acquired by the trajectory information acquiring means. As a result, it becomes possible to more efficiently acquire object movement information.

(Supplementary Note 3)

The video processing system according to Supplementary Note 2, wherein:

in a case where a state of the trajectory represented by the trajectory information is a predetermined given state, the object movement information acquiring means acquires the object movement information additionally including trajectory state information representing the given state; and the retrieval condition inputting means is configured to input the retrieval condition additionally including the trajectory state information.

According to this configuration, the object movement information acquiring means acquires object movement information to which trajectory state information indicating the state of a trajectory is added. Moreover, into the retrieval condition inputting means, retrieval conditions additionally including the state of the trajectory is inputted. With this configuration, it becomes possible to retrieve video data in consideration of the state of the trajectory. As a result, it becomes possible to retrieve video data meeting the conditions more.

(Supplementary Note 4)

The video processing system according to any of Supplementary Notes 1 to 3, wherein the retrieval condition inputting means inputs the retrieval condition by drawing a line on a background showing the predetermined plurality of segment regions.

(Supplementary Note 5)

The video processing system according to Supplementary Note 4, wherein the retrieval condition inputting means inputs the trajectory state information by performing a predetermined given operation when drawing a line on a background showing the predetermined plurality of segment regions.

(Supplementary Note 6)

The video processing system according to any of Supplementary Notes 1 to 5, further comprising one or a plurality of video data acquiring means for acquiring video data of the monitoring target area.

(Supplementary Note 7)

A video processing device comprising:

a video data retrieval part configured to acquire segment region information and sequence information as a retrieval condition and retrieve video data of a moving object, the segment region information being of a plurality of segment regions obtained by dividing a monitoring target area, the sequence information being of a sequence of the segment regions where a moving object has passed, the video data meeting the acquired retrieval condition; and a video data output part configured to output the video data acquired by the video data retrieval part.

(Supplementary Note 8)

The video processing device according to Supplementary Note 7, further comprising a video data storage part configured to store video data, wherein the video data retrieval part acquires the video data stored by the video data storage part and retrieves video data of a moving object, the video data meeting the retrieval condition.

(Supplementary Note 9)

The video processing device according to Supplementary Note 8, further comprising an object movement information acquisition part configured to detect a moving object from video data and acquiring movement segment region information as object movement information, the video data being obtained by separating a monitoring target area into a predetermined plurality of segment regions and shooting the monitoring target area, the moving object moving in the plurality of segment regions, the movement segment region information representing segment regions where the detected moving object has moved, wherein the video data storage part stores the object movement information in association with the video data corresponding to the object movement information, the object movement information being acquired by the object movement information acquisition part.

(Supplementary Note 10)

The video processing device according to Supplementary Note 9, further comprising a trajectory information acquisition part configured to acquire a trajectory as trajectory information from the video data, the trajectory being of movement of the moving object in the plurality of segment regions, wherein the object movement information acquisition part acquires the object movement information by associating the trajectory with the predetermined plurality of segment regions, the trajectory being represented by the trajectory information acquired by the trajectory information acquisition part.

(Supplementary Note 11)

The video processing device according to Supplementary Note 10, wherein:

in a case where a state of the trajectory represented by the trajectory information is a predetermined given state, the object movement information acquisition part acquires the object movement information additionally including trajectory state information representing the given state; and the video data retrieval part retrieves video data of a moving object, the video data meeting the retrieval condition including the trajectory state information.

(Supplementary Note 12)

The video processing device according to any of Supplementary Notes 8 to 11, further comprising a retrieval condition input part configured to input the retrieval condition by drawing a line on a background showing the segment regions.

(Supplementary Note 13)

The video processing device according to Supplementary Note 11, further comprising a retrieval condition input part configured to input the trajectory state information by performing a predetermined given operation when drawing a line on a background showing the segment regions.

(Supplementary Note 14)

The video processing device according to any of Supplementary Notes 8 to 13, wherein the object movement information acquisition part is configured to acquire the video data from one or a plurality of external devices.

(Supplementary Note 15)

A video processing method comprising:

acquiring segment region information and sequence information as a retrieval condition and retrieving video data of a moving object, the segment region information being of a plurality of segment regions obtained by dividing a monitoring target area, the sequence information being of a sequence of the segment regions where a moving object has passed, the video data meeting the acquired retrieval condition; and outputting the retrieved video data.

(Supplementary Note 16)

The video processing method according to Supplementary Note 15, further comprising:

detecting a moving object from video data and acquiring movement segment region information as object movement information, the video data being obtained by separating a monitoring target area into a predetermined plurality of segment regions and shooting the monitoring target area, the moving object moving in the plurality of segment regions, the movement segment region information representing segment regions where the detected moving object has moved;

storing the acquired object movement information in association with the video data corresponding to the object movement information; and retrieving video data corresponding to the object movement information.

(Supplementary Note 17)

The video processing method according to Supplementary Note 16, further comprising:

acquiring a trajectory as trajectory information from the video data, the trajectory being of movement of the moving object in the plurality of segment regions; and acquiring the object movement information by associating the trajectory with the predetermined plurality of segment regions, the trajectory being represented by the acquired trajectory information.

(Supplementary Note 18)

A computer program comprising instructions for causing a video processing device to function as:

a video data retrieval part configured to acquire segment region information and sequence information as a retrieval condition and retrieve video data of a moving object, the segment region information being of a plurality of segment regions obtained by dividing a monitoring target area, the sequence information being of sequence of the segment regions where a moving object has passed, the video data meeting the acquired retrieval condition; and a video data output part configured to output the video data acquired by the video data retrieval part.

(Supplementary Note 19)

The computer program according to Supplementary Note 18, further comprising instructions for causing the video processing device to function as a video data storage part configured to store video data, wherein the video data retrieval part acquires video data stored by the video data storage part and retrieves video data of the moving object, the video data meeting the retrieval condition.

(Supplementary Note 20)

The computer program according to Supplementary Note 19, further comprising instructions for causing the video processing device to function as:

an object movement information acquisition part configured to detects a moving object from video data and acquire movement segment region information as object movement information, the video data being obtained by separating a monitoring target area into a predetermined plurality of segment regions and by shooting the monitoring target area, the moving object moving in the plurality of segment regions, the movement segment region information representing segment regions where the detected moving object has moved, wherein the video data storage part stores the object movement information in association with video data corresponding to the object movement information, the object movement information being acquired by the object movement information acquisition part.

The program disclosed in the exemplary embodiments and supplementary note is stored in a storage device or recorded on a computer-readable recording medium. For example, the recording medium is a portable medium such as a flexible disk, an optical disk, a magneto-optical disk, or a semiconductor memory.

Although the present invention has been described above referring to the exemplary embodiments, the present invention is not limited to the exemplary embodiments described above. The configurations and details of the present invention can be modified and changed in various manners that can be understood by one skilled in the art within the scope of the present invention.

This application is based upon and claims the benefit of priority from Japanese patent application No. 2014-026467, filed on Feb. 14, 2014, the disclosure of which is incorporated herein in its entirety by reference.

DESCRIPTION OF REFERENCE NUMERALS 1 video processing device
11 object movement information acquisition part
12 video data and metadata DB
13 retrieval condition input part
14 metadata check part
2 video processing device
3 trajectory information acquisition part
31 video data reception part
32 trajectory information acquisition part
4 object movement information acquisition part
41 segment region and path defining part
42 trajectory information and segment region associating part
5 metadata accumulation part
6 retrieval condition input part
61 query input part
62 gesture recognition part
7 metadata check part
8 video data accumulation part
9 video processing system
91 video data acquiring means
92 object movement information acquiring means
93 object movement information and video data storing means
94 retrieval condition inputting means
95 video data retrieving means
10 video processing device
101 object movement information acquiring means
102 object movement information and video data storing means
103 retrieval condition inputting means
104 video data retrieval part

The invention claimed is:

1. A video processing system comprising:
at least one memory configured to store instructions; and
at least one processor configured to execute the instructions to perform:
acquiring a predetermined movement type based on a predetermined trajectory state;
acquiring video data of a monitoring area comprising a person moving within the monitoring area;
detecting a trajectory of the person in the monitoring area from the video data;
determining that a movement type of the person is the predetermined movement type based on a trajectory state of the trajectory of the person corresponding to the predetermined trajectory state; and
storing information concerning the trajectory of the person in association with the predetermined movement type of the person.

2. The video processing system according to claim 1, wherein the at least one processor is configured to perform:
determining that the movement type of the person is the predetermined movement type based on a staying time of the person.

3. The video processing system according to claim 1, wherein the at least one processor is configured to perform:
determining that the movement type of the person is the predetermined movement type based on a speed of the person.

4. The video processing system according to claim 1, wherein the predetermined movement type of the person is fast movement or wandering.

5. A video processing method comprising:
acquiring a predetermined movement type based on a predetermined trajectory state;
acquiring video data of a monitoring area comprising a person moving within the monitoring area;
detecting a trajectory of the person in the monitoring area from the video data;
determining that a movement type of the person is the predetermined movement type based on a trajectory state of the trajectory of the person corresponding to the predetermined trajectory state; and
storing information concerning the trajectory of the person in association with the predetermined movement type of the person.

6. The video processing method according to claim 5, comprising:
determining that the movement type of the person is the predetermined movement type based on a staying time of the person.

7. The video processing method according to claim 5, comprising:
determining that the movement type of the person is the predetermined movement type based on a speed of the person.

8. The video processing method according to claim 5, wherein the predetermined movement type of the person is fast movement or wandering.

9. A non-transitory computer-readable medium with a program stored thereon, the program configured to cause a computer to perform:
acquiring a predetermined movement type based on a predetermined trajectory state;
acquiring video data of a monitoring area comprising a person moving within the monitoring area;
detecting a trajectory of the person in a monitoring area from the video data;

determining that a movement type of the person is the predetermined movement type based on a trajectory state of the trajectory of the person corresponding to the predetermined trajectory state; and storing information concerning the trajectory of the person in association with the predetermined movement type of the person.

10. The non-transitory computer-readable medium with the program stored thereon according to claim 9, wherein the program is configured to cause the computer to perform:

determining that the movement type of the person is the predetermined movement type based on a staying time of the person.

11. The non-transitory computer-readable medium with the program stored thereon according to claim 9, wherein the program is configured to cause the computer to perform:

determining that the movement type of the person is the predetermined movement type based on a speed of the person.

12. The non-transitory computer-readable medium with the program stored thereon according to claim 9, wherein the predetermined movement type of the person is fast movement or wandering.

* * * * *